(12) United States Patent
Das et al.

(10) Patent No.: US 9,578,654 B2
(45) Date of Patent: Feb. 21, 2017

(54) METHODS AND APPARATUS RELATED TO SELECTING REPORTING ALTERNATIVE IN A REQUEST REPORT

(75) Inventors: Arnab Das, Summit, NJ (US); Vincent Park, Budd Lake, NJ (US); Yunus Hussain, Bridgewater, NJ (US); Samel Celebi, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1623 days.

(21) Appl. No.: 11/610,060

(22) Filed: Dec. 13, 2006

(65) Prior Publication Data

US 2007/0253358 A1 Nov. 1, 2007

Related U.S. Application Data

(63) Continuation-in-part of application No. 11/333,792, filed on Jan. 17, 2006.
(Continued)

(51) Int. Cl.
*H04W 4/00* (2009.01)
*H04W 72/12* (2009.01)
(Continued)

(52) U.S. Cl.
CPC .......... *H04W 72/1284* (2013.01); *H04L 47/10* (2013.01); *H04W 28/18* (2013.01);
(Continued)

(58) Field of Classification Search
CPC ......... H04W 4/00; H04W 80/04; H04W 88/06
(Continued)

(56) References Cited

U.S. PATENT DOCUMENTS 4,631,720 A  12/1986  Koeck
4,660,196 A   4/1987  Gray et al.
(Continued)

FOREIGN PATENT DOCUMENTS

CL   3603-2006   12/2006
CL   3604-2006   12/2006
(Continued)

OTHER PUBLICATIONS

Hosein, et al., "Optimal Assignment of Mobile Station Serving Sector for the Forward Link of a Time-Shared WirelessPacket Data Channel," Fifth IEE International Conference on 3G Mobile Communication Technologies (3G 2004), Oct. 18-Oct. 20, 2004. pp. 654-658.
(Continued)

*Primary Examiner* — Kamran Afshar
*Assistant Examiner* — Farideh Madani
(74) *Attorney, Agent, or Firm* — Ashish L. Patel

(57) ABSTRACT

Methods and apparatus related to wireless terminal reporting alternative selection for a fixed bit size control information request report, e.g., a 4 bit uplink traffic channel request report, are described. A wireless terminal maintains a plurality of different request groups corresponding to uplink traffic to be transmitted. The same request report format includes a plurality of reporting alternatives, different reporting alternatives corresponding to different request groups. Backlog can and sometimes does exist simultaneously corresponding to request groups corresponding to different reporting alternatives. The wireless terminal uses priority information associated with the request groups having non-zero backlog to select a reporting alternative. In some embodiments, at least some of the request groups have priorities which are calculated by the wireless terminal and
(Continued)

change as a function of determined transmission deadline information.

47 Claims, 22 Drawing Sheets

Related U.S. Application Data

(60) Provisional application No. 60/752,973, filed on Dec. 22, 2005.

(51) Int. Cl.
| | | |
|---|---|---|
| *H04L 12/801* | (2013.01) | |
| *H04W 28/18* | (2009.01) | |
| *H04W 72/00* | (2009.01) | |
| *H04L 1/06* | (2006.01) | |
| *H04L 27/00* | (2006.01) | |
| *H04L 27/26* | (2006.01) | |
| *H04L 1/00* | (2006.01) | |
| *H04W 24/10* | (2009.01) | |
| *H04W 28/02* | (2009.01) | |
| *H04W 28/12* | (2009.01) | |
| *H04W 28/24* | (2009.01) | |

(52) U.S. Cl.
CPC ......... *H04W 72/005* (2013.01); *H04L 1/0026* (2013.01); *H04L 1/0073* (2013.01); *H04L 1/0687* (2013.01); *H04L 1/0693* (2013.01); *H04L 27/2602* (2013.01); *H04L 27/2646* (2013.01); *H04L 2027/002* (2013.01); *H04W 24/10* (2013.01); *H04W 28/0278* (2013.01); *H04W 28/12* (2013.01); *H04W 28/24* (2013.01); *H04W 72/1221* (2013.01); *H04W 72/1236* (2013.01); *H04W 72/1242* (2013.01); *H04W 72/1252* (2013.01)

(58) Field of Classification Search
USPC ............... 370/229, 260, 231, 335, 412, 230, 413,370/415, 328; 455/419; 445/68
See application file for complete search history.

(56) References Cited

U.S. PATENT DOCUMENTS

| | | |
|---|---|---|
| 4,679,244 A | 7/1987 | Kawasaki et al. |
| 4,833,701 A | 5/1989 | Comroe et al. |
| 5,128,938 A | 7/1992 | Borras |
| 5,203,013 A | 4/1993 | Breeden et al. |
| 5,387,905 A | 2/1995 | Grube et al. |
| 5,434,848 A | 7/1995 | Chimento, Jr. et al. |
| 5,461,645 A | 10/1995 | Ishii |
| 5,465,389 A | 11/1995 | Agrawal et al. |
| 5,491,837 A | 2/1996 | Haartsen |
| 5,506,865 A | 4/1996 | Weaver, Jr. |
| 5,537,414 A | 7/1996 | Takiyasu et al. |
| 5,579,307 A | 11/1996 | Richetta et al. |
| 5,732,328 A | 3/1998 | Mitra et al. |
| 5,835,847 A | 11/1998 | Gilmore et al. |
| 5,867,478 A | 2/1999 | Baum et al. |
| 5,898,925 A | 4/1999 | Honkasalo et al. |
| 5,914,950 A | 6/1999 | Tiedemann et al. |
| 5,915,221 A | 6/1999 | Sawyer et al. |
| 5,923,650 A | 7/1999 | Chen et al. |
| 5,933,421 A | 8/1999 | Alamouti et al. |
| 5,940,771 A | 8/1999 | Gollnick et al. |
| 5,966,657 A | 10/1999 | Sporre |
| 5,966,662 A | 10/1999 | Murto |
| 5,978,657 A | 11/1999 | Suzuki |
| 5,999,534 A | 12/1999 | Kim |
| 6,002,676 A | 12/1999 | Fleming |
| 6,004,276 A | 12/1999 | Wright et al. |
| 6,026,081 A | 2/2000 | Hamabe et al. |
| 6,028,842 A | 2/2000 | Chapman et al. |
| 6,028,843 A | 2/2000 | Delp et al. |
| 6,035,000 A | 3/2000 | Bingham et al. |
| 6,069,871 A | 5/2000 | Sharma et al. |
| 6,070,072 A | 5/2000 | Dorenbosch et al. |
| 6,073,025 A | 6/2000 | Chheda et al. |
| 6,075,025 A | 6/2000 | Bishop et al. |
| 6,122,270 A | 9/2000 | Whinnett et al. |
| 6,128,506 A | 10/2000 | Knutsson et al. |
| 6,131,016 A | 10/2000 | Greenstein et al. |
| 6,141,565 A | 10/2000 | Feuerstein et al. |
| 6,169,896 B1 | 1/2001 | Sant et al. |
| 6,173,005 B1 | 1/2001 | Kotzin et al. |
| 6,181,948 B1 | 1/2001 | Kondo |
| 6,201,793 B1 | 3/2001 | Chen et al. |
| 6,205,129 B1 | 3/2001 | Esteves et al. |
| 6,215,791 B1 | 4/2001 | Kim |
| 6,236,646 B1 | 5/2001 | Beming et al. |
| 6,256,478 B1 | 7/2001 | Allen et al. |
| 6,259,927 B1 | 7/2001 | Butovitsch et al. |
| 6,263,392 B1 | 7/2001 | McCauley |
| 6,298,233 B1 | 10/2001 | Souissi et al. |
| 6,308,080 B1 | 10/2001 | Burt et al. |
| 6,310,857 B1 | 10/2001 | Duffield et al. |
| 6,311,065 B1 | 10/2001 | Ushiki et al. |
| 6,374,085 B1 | 4/2002 | Saints et al. |
| 6,377,583 B1 | 4/2002 | Lyles et al. |
| 6,377,955 B1 | 4/2002 | Hartmann et al. |
| 6,405,047 B1 | 6/2002 | Moon |
| 6,414,946 B1 | 7/2002 | Satou et al. |
| 6,445,917 B1 | 9/2002 | Bark et al. |
| 6,453,151 B1 | 9/2002 | Kiang et al. |
| 6,493,539 B1 | 12/2002 | Falco et al. |
| 6,526,281 B1 | 2/2003 | Gorsuch et al. |
| 6,538,986 B2 | 3/2003 | Isaksson et al. |
| 6,545,999 B1 | 4/2003 | Sugita |
| 6,553,336 B1 | 4/2003 | Johnson et al. |
| 6,590,890 B1 | 7/2003 | Stolyar et al. |
| 6,597,914 B1 | 7/2003 | Silventoinen et al. |
| 6,600,903 B1 | 7/2003 | Lilja et al. |
| 6,609,007 B1 | 8/2003 | Eibling et al. |
| 6,621,808 B1 | 9/2003 | Sadri |
| 6,625,133 B1 | 9/2003 | Balachandran et al. |
| 6,662,024 B2 | 12/2003 | Walton et al. |
| 6,671,512 B2 | 12/2003 | Laakso et al. |
| 6,680,909 B1 | 1/2004 | Bansal et al. |
| 6,697,417 B2 | 2/2004 | Fernandez-Corbaton et al. |
| 6,710,651 B2 | 3/2004 | Forrester |
| 6,742,020 B1 | 5/2004 | Dimitroff et al. |
| 6,745,003 B1 | 6/2004 | Maca et al. |
| 6,745,044 B1 | 6/2004 | Holtzman et al. |
| 6,751,187 B2 | 6/2004 | Walton et al. |
| 6,771,934 B2 | 8/2004 | Demers et al. |
| 6,788,963 B2 | 9/2004 | Laroia et al. |
| 6,798,761 B2 | 9/2004 | Cain et al. |
| 6,804,289 B2 | 10/2004 | Takahashi |
| 6,804,521 B2 | 10/2004 | Tong et al. |
| 6,816,476 B2 | 11/2004 | Kim et al. |
| 6,836,673 B1 | 12/2004 | Trott |
| 6,865,168 B1 | 3/2005 | Sekine |
| 6,889,056 B2 | 5/2005 | Shibutani |
| 6,889,257 B1 | 5/2005 | Patel |
| 6,892,071 B2 | 5/2005 | Park et al. |
| 6,895,005 B1 * | 5/2005 | Malin ............... H04L 47/10 370/389 |
| 6,895,364 B2 | 5/2005 | Banfer |
| 6,901,268 B2 | 5/2005 | Chang et al. |
| 6,901,270 B1 | 5/2005 | Beach |
| 6,904,016 B2 | 6/2005 | Kuo et al. |
| 6,912,405 B2 | 6/2005 | Hiramatsu et al. |
| 6,917,607 B1 | 7/2005 | Yeom et al. |
| 6,940,827 B2 | 9/2005 | Li et al. |
| 6,957,072 B2 | 10/2005 | Kangras et al. |
| 6,967,937 B1 | 11/2005 | Gormley |
| 6,968,156 B2 | 11/2005 | Sugaya et al. |
| 7,006,841 B2 | 2/2006 | Momogioudis et al. |
| 7,024,460 B2 | 4/2006 | Koopmans et al. |
| 7,027,782 B2 | 4/2006 | Moon et al. |

(56) References Cited

U.S. PATENT DOCUMENTS

| | | |
|---|---|---|
| 7,031,983 B2 | 4/2006 | Israni et al. |
| 7,034,254 B2 | 4/2006 | Grabowski et al. |
| 7,039,029 B2 | 5/2006 | Lee et al. |
| 7,043,254 B2 | 5/2006 | Chawla et al. |
| 7,047,009 B2 | 5/2006 | Laroia et al. |
| 7,054,643 B2 | 5/2006 | Trossen et al. |
| 7,061,885 B2 | 6/2006 | Kurtz |
| 7,092,672 B1 | 8/2006 | Pekonen et al. |
| 7,120,123 B1 | 10/2006 | Quigley et al. |
| 7,120,448 B2 | 10/2006 | Brouwer et al. |
| 7,123,910 B2 | 10/2006 | Lucidarme et al. |
| 7,139,536 B2 | 11/2006 | Chiu |
| 7,142,548 B2 | 11/2006 | Fong et al. |
| 7,146,172 B2 | 12/2006 | Li et al. |
| 7,158,796 B2 | 1/2007 | Tiedemann, Jr. et al. |
| 7,161,909 B2 | 1/2007 | Sharma |
| 7,162,203 B1 | 1/2007 | Brunner et al. |
| 7,164,883 B2 | 1/2007 | Rappaport et al. |
| 7,197,025 B2 | 3/2007 | Chuah |
| 7,203,493 B2 | 4/2007 | Fujii et al. |
| 7,212,821 B2 | 5/2007 | Laroia et |
| 7,218,948 B2 | 5/2007 | Laroia et al. |
| 7,245,935 B2 | 7/2007 | Lin |
| 7,260,054 B2 | 8/2007 | Olszewski et al. |
| 7,269,406 B2 | 9/2007 | Qi |
| 7,277,709 B2 | 10/2007 | Vadgama |
| 7,277,737 B1 | 10/2007 | Vollmer et al. |
| 7,280,814 B2 | 10/2007 | Austin et al. |
| 7,283,559 B2 | 10/2007 | Cho et al. |
| 7,283,836 B2 | 10/2007 | Hwang et al. |
| 7,299,277 B1 | 11/2007 | Moran et al. |
| 7,317,921 B2 | 1/2008 | Mueckenheim et al. |
| 7,319,680 B2 | 1/2008 | Cho |
| 7,321,563 B2 | 1/2008 | Kim et al. |
| 7,340,267 B2 | 3/2008 | Budka et al. |
| 7,349,667 B2 | 3/2008 | Magee et al. |
| 7,356,635 B2 | 4/2008 | Woodings et al. |
| 7,362,702 B2 | 4/2008 | Terrell et al. |
| 7,382,755 B2 | 6/2008 | Dugad et al. |
| 7,395,058 B1 | 7/2008 | Kalofonos et al. |
| 7,397,803 B2 | 7/2008 | Love et al. |
| 7,400,901 B2 | 7/2008 | Kostic et al. |
| 7,412,265 B2 | 8/2008 | Chen et al. |
| 7,418,260 B2 | 8/2008 | Lucidarme |
| 7,420,939 B2 | 9/2008 | Laroia et al. |
| 7,430,206 B2 | 9/2008 | Terry et al. |
| 7,430,207 B2 | 9/2008 | Wu et al. |
| 7,430,420 B2 | 9/2008 | Derakhshan et al. |
| 7,447,148 B2 | 11/2008 | Gao et al. |
| 7,463,577 B2 | 12/2008 | Sudo et al. |
| 7,486,620 B2 | 2/2009 | Seol |
| 7,486,638 B2 | 2/2009 | Ofuji et al. |
| 7,502,614 B2 | 3/2009 | Uchida et al. |
| 7,508,792 B2 | 3/2009 | Petrovic et al. |
| 7,510,828 B2 | 3/2009 | Lynn et al. |
| 7,512,076 B2 | 3/2009 | Kwon et al. |
| 7,512,185 B2 | 3/2009 | Sharon et al. |
| 7,519,013 B2 | 4/2009 | Destino et al. |
| 7,519,033 B2 | 4/2009 | Soomro |
| 7,522,544 B2 | 4/2009 | Cheng et al. |
| 7,525,971 B2 | 4/2009 | Carroll et al. |
| 7,526,091 B2 | 4/2009 | Jeong et al. |
| 7,558,235 B2 | 7/2009 | Lester et al. |
| 7,558,572 B2 | 7/2009 | Anigstein |
| 7,561,893 B2 | 7/2009 | Moulsley et al. |
| 7,668,573 B2 | 2/2010 | Laroia et al. |
| 7,743,284 B1 | 6/2010 | Taylor et al. |
| 8,040,831 B2 | 10/2011 | Kurtz et al. |
| RE43,593 E | 8/2012 | Kayama et al. |
| 8,325,621 B2 | 12/2012 | Simonsson et al. |
| 8,437,251 B2 | 5/2013 | Das et al. |
| 8,989,084 B2 | 3/2015 | Hande et al. |
| 2001/0007552 A1 | 7/2001 | Schiff et al. |
| 2001/0036181 A1 | 11/2001 | Rogers |
| 2001/0046878 A1 | 11/2001 | Chang et al. |
| 2001/0055293 A1 | 12/2001 | Parsa et al. |
| 2002/0012326 A1 | 1/2002 | Chang et al. |
| 2002/0031105 A1 | 3/2002 | Zeira et al. |
| 2002/0037729 A1 | 3/2002 | Kitazawa et al. |
| 2002/0045448 A1 | 4/2002 | Park et al. |
| 2002/0049040 A1 | 4/2002 | Sugaya et al. |
| 2002/0075835 A1 | 6/2002 | Krishnakumar et al. |
| 2002/0077140 A1 | 6/2002 | Monogioudis et al. |
| 2002/0080967 A1 | 6/2002 | Abdo et al. |
| 2002/0082011 A1 | 6/2002 | Fujii et al. |
| 2002/0085516 A1 | 7/2002 | Bridgelall |
| 2002/0093953 A1 | 7/2002 | Naim et al. |
| 2002/0107028 A1 | 8/2002 | Rantalainen et al. |
| 2002/0122431 A1 | 9/2002 | Cho et al. |
| 2002/0136195 A1 | 9/2002 | Kurtz et al. |
| 2002/0142788 A1 | 10/2002 | Chawla et al. |
| 2002/0143858 A1 | 10/2002 | Teague et al. |
| 2002/0147017 A1 | 10/2002 | Li et al. |
| 2002/0160802 A1 | 10/2002 | Hiramatsu et al. |
| 2002/0177452 A1 | 11/2002 | Ruutu et al. |
| 2002/0186678 A1 | 12/2002 | Averbuch et al. |
| 2003/0003921 A1 | 1/2003 | Laakso et al. |
| 2003/0007498 A1 | 1/2003 | Angle et al. |
| 2003/0012212 A1 | 1/2003 | Earnshaw et al. |
| 2003/0016641 A1 | 1/2003 | Terry et al. |
| 2003/0027587 A1 | 2/2003 | Proctor, Jr. et al. |
| 2003/0028606 A1* | 2/2003 | Koopmans ......... H04L 12/5835 709/206 |
| 2003/0064737 A1 | 4/2003 | Eriksson et al. |
| 2003/0078067 A1 | 4/2003 | Kim et al. |
| 2003/0095519 A1 | 5/2003 | Kuo et al. |
| 2003/0100269 A1 | 5/2003 | Lehtinen et al. |
| 2003/0114180 A1 | 6/2003 | Black et al. |
| 2003/0123396 A1 | 7/2003 | Seo et al. |
| 2003/0123410 A1 | 7/2003 | Youm |
| 2003/0139197 A1 | 7/2003 | Kostic et al. |
| 2003/0144042 A1 | 7/2003 | Weinfield et al. |
| 2003/0157899 A1 | 8/2003 | Trossen et al. |
| 2003/0161285 A1 | 8/2003 | Tiedemann et al. |
| 2003/0169705 A1 | 9/2003 | Knisely et al. |
| 2003/0185224 A1 | 10/2003 | Ramanan et al. |
| 2003/0185285 A1 | 10/2003 | Talwar |
| 2003/0193915 A1 | 10/2003 | Lee et al. |
| 2003/0198204 A1 | 10/2003 | Taneja et al. |
| 2003/0198206 A1 | 10/2003 | Cain et al. |
| 2003/0206541 A1 | 11/2003 | Yun et al. |
| 2003/0207691 A1 | 11/2003 | Chen |
| 2003/0207693 A1 | 11/2003 | Roderique |
| 2003/0214906 A1 | 11/2003 | Hu et al. |
| 2003/0214928 A1 | 11/2003 | Chuah et al. |
| 2003/0223354 A1 | 12/2003 | Olszewski et al. |
| 2004/0001429 A1 | 1/2004 | Ma et al. |
| 2004/0004954 A1 | 1/2004 | Terry et al. |
| 2004/0013103 A1 | 1/2004 | Zhang et al. |
| 2004/0057402 A1 | 3/2004 | Ramos et al. |
| 2004/0062206 A1 | 4/2004 | Soong et al. |
| 2004/0081089 A1 | 4/2004 | Ayyagari et al. |
| 2004/0082344 A1 | 4/2004 | Moilanen et al. |
| 2004/0085936 A1* | 5/2004 | Gopalakrishnan et al. .. 370/335 |
| 2004/0091026 A1 | 5/2004 | Nakayama |
| 2004/0111640 A1 | 6/2004 | Baum |
| 2004/0120411 A1 | 6/2004 | Walton et al. |
| 2004/0125776 A1 | 7/2004 | Haugli et al. |
| 2004/0127226 A1 | 7/2004 | Dugad et al. |
| 2004/0131007 A1 | 7/2004 | Smee et al. |
| 2004/0141466 A1 | 7/2004 | Kim et al. |
| 2004/0147262 A1 | 7/2004 | Lescuyer et al. |
| 2004/0147276 A1 | 7/2004 | Gholmieh et al. |
| 2004/0160922 A1 | 8/2004 | Nanda et al. |
| 2004/0162097 A1 | 8/2004 | Vijayan et al. |
| 2004/0166869 A1 | 8/2004 | Laroia et al. |
| 2004/0166886 A1 | 8/2004 | Laroia et al. |
| 2004/0166887 A1 | 8/2004 | Laroia et al. |
| 2004/0171401 A1* | 9/2004 | Balachandran ......... H04W 4/24 455/522 |
| 2004/0180658 A1 | 9/2004 | Uchida et al. |
| 2004/0184410 A1 | 9/2004 | Park |
| 2004/0192371 A1 | 9/2004 | Zhao et al. |
| 2004/0196802 A1 | 10/2004 | Bae et al. |

(56) References Cited

U.S. PATENT DOCUMENTS

| | | |
|---|---|---|
| 2004/0203717 A1 | 10/2004 | Wingrowicz et al. |
| 2004/0203981 A1 | 10/2004 | Budka et al. |
| 2004/0218617 A1 | 11/2004 | Sagfors |
| 2004/0223455 A1 | 11/2004 | Fong et al. |
| 2004/0224677 A1 | 11/2004 | Kuchibhotla et al. |
| 2004/0228313 A1 | 11/2004 | Cheng et al. |
| 2004/0233838 A1 | 11/2004 | Sudo et al. |
| 2004/0235510 A1 | 11/2004 | Elicegui et al. |
| 2004/0248518 A1 | 12/2004 | Kashiwase et al. |
| 2004/0248568 A1 | 12/2004 | Lucidarme et al. |
| 2004/0252647 A1 | 12/2004 | Chang et al. |
| 2004/0252662 A1 | 12/2004 | Cho et al. |
| 2004/0253996 A1 | 12/2004 | Chen et al. |
| 2004/0258040 A1 | 12/2004 | Joshi et al. |
| 2004/0259546 A1 | 12/2004 | Balachandran et al. |
| 2004/0264414 A1 | 12/2004 | Dorenbosch |
| 2004/0266474 A1 | 12/2004 | Petrus et al. |
| 2005/0003847 A1 | 1/2005 | Love et al. |
| 2005/0008892 A1 | 1/2005 | Yamamoto et al. |
| 2005/0037775 A1 | 2/2005 | Moeglein et al. |
| 2005/0047344 A1 | 3/2005 | Seol et al. |
| 2005/0047393 A1 | 3/2005 | Liu et al. |
| 2005/0047416 A1* | 3/2005 | Heo .................. H04W 72/1242 370/395.4 |
| 2005/0053099 A1 | 3/2005 | Spear et al. |
| 2005/0058637 A1 | 3/2005 | Lynn et al. |
| 2005/0064821 A1 | 3/2005 | Hedberg et al. |
| 2005/0068922 A1 | 3/2005 | Jalali |
| 2005/0085197 A1 | 4/2005 | Laroia et al. |
| 2005/0099987 A1 | 5/2005 | Lester et al. |
| 2005/0111361 A1 | 5/2005 | Hosein |
| 2005/0111462 A1 | 5/2005 | Walton et al. |
| 2005/0118993 A1 | 6/2005 | Roux et al. |
| 2005/0122900 A1 | 6/2005 | Tuulos et al. |
| 2005/0128999 A1 | 6/2005 | Kwon et al. |
| 2005/0135320 A1 | 6/2005 | Tiedemann et al. |
| 2005/0136937 A1 | 6/2005 | Qian et al. |
| 2005/0143084 A1 | 6/2005 | Cheng et al. |
| 2005/0143114 A1 | 6/2005 | Moulsley et al. |
| 2005/0152320 A1 | 7/2005 | Marinier et al. |
| 2005/0157803 A1 | 7/2005 | Kim et al. |
| 2005/0157876 A1 | 7/2005 | Jeong et al. |
| 2005/0170782 A1 | 8/2005 | Rong et al. |
| 2005/0181732 A1 | 8/2005 | Kang et al. |
| 2005/0185632 A1 | 8/2005 | Draves et al. |
| 2005/0195765 A1 | 9/2005 | Sharon et al. |
| 2005/0201331 A1 | 9/2005 | Gaal et al. |
| 2005/0201353 A1 | 9/2005 | Lee et al. |
| 2005/0207335 A1 | 9/2005 | Schmidl et al. |
| 2005/0207359 A1 | 9/2005 | Hwang et al. |
| 2005/0207373 A1 | 9/2005 | Roy et al. |
| 2005/0220052 A1 | 10/2005 | Uehara et al. |
| 2005/0232154 A1 | 10/2005 | Bang et al. |
| 2005/0243938 A1 | 11/2005 | Armstrong et al. |
| 2005/0249118 A1 | 11/2005 | Terry et al. |
| 2005/0250509 A1 | 11/2005 | Choksi |
| 2005/0250510 A1 | 11/2005 | Kaikkonen et al. |
| 2005/0250529 A1 | 11/2005 | Funnell et al. |
| 2005/0255873 A1 | 11/2005 | Zhang et al. |
| 2005/0259662 A1 | 11/2005 | Kim et al. |
| 2005/0265301 A1 | 12/2005 | Heo et al. |
| 2005/0281232 A1 | 12/2005 | Kim et al. |
| 2005/0281278 A1 | 12/2005 | Black et al. |
| 2005/0289256 A1 | 12/2005 | Cudak et al. |
| 2006/0003767 A1 | 1/2006 | Kim et al. |
| 2006/0015357 A1 | 1/2006 | Cagan |
| 2006/0018284 A1 | 1/2006 | Rudolf et al. |
| 2006/0019694 A1 | 1/2006 | Sutivong et al. |
| 2006/0034174 A1 | 2/2006 | Nishibayashi et al. |
| 2006/0040696 A1 | 2/2006 | Lin et al. |
| 2006/0045013 A1 | 3/2006 | Vannithamby et al. |
| 2006/0056346 A1 | 3/2006 | Vadgama et al. |
| 2006/0073836 A1 | 4/2006 | Laroia et al. |
| 2006/0079257 A1 | 4/2006 | Iochi et al. |
| 2006/0079267 A1 | 4/2006 | Kim et al. |
| 2006/0083161 A1 | 4/2006 | Laroia et al. |
| 2006/0089104 A1 | 4/2006 | Kaikkonen et al. |
| 2006/0092881 A1 | 5/2006 | Laroia et al. |
| 2006/0104240 A1 | 5/2006 | Sebire et al. |
| 2006/0120470 A1 | 6/2006 | Hwang et al. |
| 2006/0126497 A1 | 6/2006 | Na et al. |
| 2006/0128410 A1 | 6/2006 | Derryberry et al. |
| 2006/0128412 A1 | 6/2006 | Mantha et al. |
| 2006/0133346 A1 | 6/2006 | Chheda et al. |
| 2006/0135193 A1 | 6/2006 | Ratasuk et al. |
| 2006/0140154 A1 | 6/2006 | Kwak et al. |
| 2006/0142032 A1 | 6/2006 | Derakhshan et al. |
| 2006/0164981 A1 | 7/2006 | Olsson et al. |
| 2006/0165029 A1 | 7/2006 | Melpignano et al. |
| 2006/0176807 A1* | 8/2006 | Wu et al. ....................... 370/229 |
| 2006/0182022 A1 | 8/2006 | Abedi |
| 2006/0203765 A1 | 9/2006 | Laroia et al. |
| 2006/0205356 A1 | 9/2006 | Laroia et al. |
| 2006/0205396 A1* | 9/2006 | Laroia .................. H04L 1/0015 455/422.1 |
| 2006/0215604 A1 | 9/2006 | Mueckenheim et al. |
| 2006/0234722 A1 | 10/2006 | Hanebeck et al. |
| 2006/0245452 A1 | 11/2006 | Frederiksen et al. |
| 2006/0246916 A1 | 11/2006 | Cheng et al. |
| 2006/0256747 A1 | 11/2006 | Jaakkola |
| 2006/0270399 A1 | 11/2006 | Qi et al. |
| 2006/0285481 A1 | 12/2006 | Lane et al. |
| 2006/0287743 A1 | 12/2006 | Sampath et al. |
| 2007/0002757 A1 | 1/2007 | Soomro et al. |
| 2007/0002806 A1 | 1/2007 | Soomro et al. |
| 2007/0004437 A1 | 1/2007 | Harada et al. |
| 2007/0010226 A1 | 1/2007 | Laroia et al. |
| 2007/0015541 A1 | 1/2007 | Dominique et al. |
| 2007/0026803 A1 | 2/2007 | Malm |
| 2007/0026808 A1 | 2/2007 | Love et al. |
| 2007/0026810 A1 | 2/2007 | Love et al. |
| 2007/0030828 A1 | 2/2007 | Vimpari et al. |
| 2007/0036116 A1 | 2/2007 | Eiger et al. |
| 2007/0054624 A1 | 3/2007 | Kashiwagi |
| 2007/0057952 A1 | 3/2007 | Swedberg et al. |
| 2007/0066273 A1 | 3/2007 | Laroia et al. |
| 2007/0070894 A1 | 3/2007 | Wang et al. |
| 2007/0081492 A1 | 4/2007 | Petrovic et al. |
| 2007/0081498 A1 | 4/2007 | Niwano |
| 2007/0104128 A1 | 5/2007 | Laroia et al. |
| 2007/0104164 A1 | 5/2007 | Laroia et al. |
| 2007/0109999 A1 | 5/2007 | Brunner |
| 2007/0133412 A1 | 6/2007 | Hutter et al. |
| 2007/0140168 A1 | 6/2007 | Laroia et al. |
| 2007/0140179 A1 | 6/2007 | Zhang et al. |
| 2007/0141994 A1 | 6/2007 | Cheng et al. |
| 2007/0147283 A1 | 6/2007 | Laroia et al. |
| 2007/0147377 A1 | 6/2007 | Laroia et al. |
| 2007/0149126 A1 | 6/2007 | Rangan et al. |
| 2007/0149128 A1 | 6/2007 | Das et al. |
| 2007/0149129 A1 | 6/2007 | Das et al. |
| 2007/0149131 A1 | 6/2007 | Li et al. |
| 2007/0149132 A1 | 6/2007 | Li et al. |
| 2007/0149137 A1 | 6/2007 | Richardson et al. |
| 2007/0149138 A1 | 6/2007 | Das et al. |
| 2007/0149194 A1 | 6/2007 | Das et al. |
| 2007/0149227 A1 | 6/2007 | Parizhsky et al. |
| 2007/0149228 A1 | 6/2007 | Das |
| 2007/0149238 A1 | 6/2007 | Das et al. |
| 2007/0159969 A1 | 7/2007 | Das et al. |
| 2007/0168326 A1 | 7/2007 | Das et al. |
| 2007/0169326 A1 | 7/2007 | Smith |
| 2007/0173208 A1 | 7/2007 | Nishio et al. |
| 2007/0177510 A1 | 8/2007 | Natarajan et al. |
| 2007/0183308 A1 | 8/2007 | Korobkov et al. |
| 2007/0213087 A1 | 9/2007 | Laroia et al. |
| 2007/0243882 A1 | 10/2007 | Edge |
| 2007/0249287 A1 | 10/2007 | Das et al. |
| 2007/0249360 A1 | 10/2007 | Das et al. |
| 2007/0253355 A1 | 11/2007 | Hande et al. |
| 2007/0253357 A1 | 11/2007 | Das et al. |
| 2007/0253385 A1 | 11/2007 | Li et al. |
| 2007/0253449 A1 | 11/2007 | Das et al. |
| 2007/0258365 A1 | 11/2007 | Das et al. |

(56) References Cited

U.S. PATENT DOCUMENTS

| | | | |
|---|---|---|---|
| 2008/0031368 A1 | 2/2008 | Lindoff et al. | |
| 2008/0037474 A1* | 2/2008 | Niwano | H04W 72/1268 370/335 |
| 2008/0051086 A2 | 2/2008 | Etemad et al. | |
| 2008/0057969 A1 | 3/2008 | Agami et al. | |
| 2008/0076462 A1 | 3/2008 | Iochi et al. | |
| 2008/0144521 A1 | 6/2008 | Soomro et al. | |
| 2008/0159235 A1 | 7/2008 | Son et al. | |
| 2008/0167047 A1 | 7/2008 | Abedi | |
| 2008/0212524 A1 | 9/2008 | Niwano | |
| 2009/0004983 A1 | 1/2009 | Darabi | |
| 2009/0034455 A1 | 2/2009 | Lee et al. | |
| 2009/0103507 A1 | 4/2009 | Gu et al. | |
| 2009/0252122 A1 | 10/2009 | Leinonen et al. | |
| 2009/0303900 A1 | 12/2009 | Cho et al. | |
| 2010/0177731 A1 | 7/2010 | Ananthaiyer et al. | |
| 2010/0220626 A1 | 9/2010 | Das et al. | |
| 2011/0090812 A1 | 4/2011 | Aoyama | |
| 2011/0149789 A1 | 6/2011 | Edge | |
| 2012/0140756 A1 | 6/2012 | Rudolf et al. | |
| 2013/0230027 A1 | 9/2013 | Das et al. | |
| 2013/0242888 A1 | 9/2013 | Das et al. | |
| 2015/0043374 A1 | 2/2015 | Hande et al. | |
| 2015/0333948 A1* | 11/2015 | Richardson | H04L 27/2602 370/329 |
| 2015/0334590 A1* | 11/2015 | Das | H04W 72/0413 370/252 |
| 2016/0255633 A1 | 9/2016 | Parizhsky | |

FOREIGN PATENT DOCUMENTS

| | | |
|---|---|---|
| CL | 3605-2006 | 12/2006 |
| CN | 1159262 A | 9/1997 |
| CN | 1159286 A | 9/1997 |
| CN | 1265792 | 9/2000 |
| CN | 1286006 A | 2/2001 |
| CN | 1286821 A | 3/2001 |
| CN | 1286832 A | 3/2001 |
| CN | 1316140 | 10/2001 |
| CN | 1335036 A | 2/2002 |
| CN | 1338877 A | 3/2002 |
| CN | 1338878 A | 3/2002 |
| CN | 1507708 | 6/2004 |
| CN | 1545252 A | 11/2004 |
| CN | 1604685 | 4/2005 |
| CN | 1684457 A | 10/2005 |
| DE | 10162564 | 7/2003 |
| EP | 1037419 A2 | 9/2000 |
| EP | 1037491 | 9/2000 |
| EP | 1 054 518 | 11/2000 |
| EP | 1089500 A2 | 4/2001 |
| EP | 1179962 A2 | 2/2002 |
| EP | 1180881 | 2/2002 |
| EP | 1180907 | 2/2002 |
| EP | 1221273 A1 | 7/2002 |
| EP | 1233637 A1 | 8/2002 |
| EP | 1377100 A2 | 1/2004 |
| EP | 1493284 A1 | 1/2005 |
| EP | 1511245 | 3/2005 |
| EP | 1564953 A2 | 8/2005 |
| EP | 1571762 A1 | 9/2005 |
| EP | 1 594 260 | 11/2005 |
| EP | 1758276 A1 | 2/2007 |
| EP | 1841259 | 10/2007 |
| GB | 2340693 A | 2/2000 |
| JP | 08008806 | 1/1996 |
| JP | 8503591 | 4/1996 |
| JP | 9275582 A | 10/1997 |
| JP | 09307939 | 11/1997 |
| JP | 10022975 A | 1/1998 |
| JP | 10173585 | 6/1998 |
| JP | 11122167 A | 4/1999 |
| JP | 2000049689 A | 2/2000 |
| JP | 2001007761 A | 1/2001 |
| JP | 2001016152 | 1/2001 |
| JP | 2001510974 | 8/2001 |
| JP | 2001512921 T | 8/2001 |
| JP | 2001251680 A | 9/2001 |
| JP | 2001523901 T | 11/2001 |
| JP | 2001525135 T | 12/2001 |
| JP | 2002077992 | 3/2002 |
| JP | 2002111627 A | 4/2002 |
| JP | 2002262330 A | 9/2002 |
| JP | 2003018641 A | 1/2003 |
| JP | 2003500911 | 1/2003 |
| JP | 2003509983 A | 3/2003 |
| JP | 2003510887 T | 3/2003 |
| JP | 03520153 A | 7/2003 |
| JP | 2003244161 | 8/2003 |
| JP | 2004153585 | 5/2004 |
| JP | 2004297284 A | 10/2004 |
| JP | 2004533731 | 11/2004 |
| JP | 2004350052 | 12/2004 |
| JP | 2005073276 | 3/2005 |
| JP | 2005130482 | 5/2005 |
| JP | 2005136773 A | 5/2005 |
| JP | 2005142965 A | 6/2005 |
| JP | 2005525730 A | 8/2005 |
| JP | 2005526417 A | 9/2005 |
| JP | 2005333671 | 12/2005 |
| JP | 2006514735 A | 5/2006 |
| JP | 2006518578 A | 8/2006 |
| JP | 06268574 A | 10/2006 |
| JP | 2006524966 T | 11/2006 |
| JP | 2006526323 A | 11/2006 |
| JP | 2007503156 A | 2/2007 |
| JP | 2007509531 A | 4/2007 |
| JP | 2007514364 A | 5/2007 |
| JP | 2007514378 T | 5/2007 |
| JP | 2007522692 A | 8/2007 |
| JP | 2007525044 A | 8/2007 |
| JP | 2007525045 T | 8/2007 |
| JP | 2011045054 | 3/2011 |
| KR | 1019990084525 | 12/1999 |
| KR | 20010014223 | 2/2001 |
| KR | 20040018526 | 3/2004 |
| KR | 20040053859 A | 6/2004 |
| KR | 20040084599 A | 10/2004 |
| KR | 20040110044 A | 12/2004 |
| KR | 20050021083 | 3/2005 |
| KR | 20050023187 A | 3/2005 |
| KR | 20050039376 A | 4/2005 |
| KR | 1020050099633 | 10/2005 |
| KR | 1020050121274 | 12/2005 |
| KR | 20060012282 A | 2/2006 |
| RU | 2149518 C1 | 5/2000 |
| RU | 2181529 | 4/2002 |
| RU | 2188506 C2 | 8/2002 |
| RU | 2202154 C2 | 4/2003 |
| TW | 200423642 | 11/2004 |
| WO | 9408432 | 4/1994 |
| WO | WO9623371 A1 | 8/1996 |
| WO | WO9845967 A2 | 10/1998 |
| WO | WO9856120 A2 | 12/1998 |
| WO | 9907090 A1 | 2/1999 |
| WO | 9909779 A1 | 2/1999 |
| WO | WO 9913600 A1 | 3/1999 |
| WO | WO9959254 A2 | 11/1999 |
| WO | 0001188 A1 | 1/2000 |
| WO | WO0101610 A1 | 1/2001 |
| WO | 0122759 A1 | 3/2001 |
| WO | WO0135548 A1 | 5/2001 |
| WO | 0142047 A2 | 6/2001 |
| WO | WO0182504 | 11/2001 |
| WO | 0199291 A2 | 12/2001 |
| WO | WO0232183 A1 | 4/2002 |
| WO | WO0233841 A1 | 4/2002 |
| WO | WO 0239760 A2 | 5/2002 |
| WO | WO0249305 | 6/2002 |
| WO | WO02073831 A1 | 9/2002 |
| WO | WO 02101941 A2 | 12/2002 |
| WO | WO02104058 A1 | 12/2002 |
| WO | WO03094544 A1 | 11/2003 |

(56) References Cited

FOREIGN PATENT DOCUMENTS

| WO | WO 03105498 A1 | 12/2003 |
|---|---|---|
| WO | 2004031918 A2 | 4/2004 |
| WO | 2004077685 | 9/2004 |
| WO | 2004084503 | 9/2004 |
| WO | WO2004084452 | 9/2004 |
| WO | WO-2004084575 A2 | 9/2004 |
| WO | 2004100450 | 11/2004 |
| WO | WO-2004098072 A2 | 11/2004 |
| WO | 2004110081 | 12/2004 |
| WO | WO 2004105420 A1 | 12/2004 |
| WO | 2005018115 A1 | 2/2005 |
| WO | 2005020490 | 3/2005 |
| WO | 2005039119 A1 | 4/2005 |
| WO | WO 2005034438 | 4/2005 |
| WO | 2005060132 | 6/2005 |
| WO | WO2005057812 A1 | 6/2005 |
| WO | WO2005060271 A1 | 6/2005 |
| WO | WO2005060277 A2 | 6/2005 |
| WO | 2005065056 | 7/2005 |
| WO | WO2005065056 A2 | 7/2005 |
| WO | WO2005069519 | 7/2005 |
| WO | 2005107311 A1 | 11/2005 |
| WO | WO2005125049 A1 | 12/2005 |
| WO | WO2006044718 A2 | 4/2006 |
| WO | 2006075293 | 7/2006 |
| WO | 2007031956 | 3/2007 |

OTHER PUBLICATIONS

Kwon, et el., "Quasi-Dedicated Access Scheme for Uplink Realtime Services in Future Wireless Communication Systems," Vehicular Technology Conference, 2005. VTC 2005—Spring. 2005 IEEE 61st Stockholm, Sweden, Apr. 20-May 1, 2005, Piscataway, NJ, USA, May 30, 2005, pp. 3117-3121.
Majmundar, "Impact of Mobile-Originated Short Message Service on the Digital Control Channel of TDMA Systems," Vehicular Technology Conference, 2000. IEEE VTS Fall VTC 2000. 52nd Sep. 24-28, 2000, Piscataway, NJ, USA, IEEE, Sep. 24, 2000, pp. 1550-1555.
Gunnarson, F., et al.: "Uplink Admission Control in WCDMA Based on Relative Load Estimates", IEEE International Conference on Communications, vol. 1, pp. 3091-3095, IEEE, New York, NY USA (Apr. 28, 2002).
Wada, "Study of an OFDM Cellular System Using a Single Band," 2002 Communication Society Convention, Collection of Lecture Papers 1, Japan, IEEE, Aug. 20, 2002, p. 355, B-5-58.
International Search Report and Written Opinion—PCT/US2006/048652, International Search Authority—U.S. Patent Office—Aug. 21, 2008.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 1-356, Sep. 2004.
IEEE P802.16e/D5: "Draft IEEE Standard for Local and metropolitan area networks, Part 16: Air Interface for Fixed and Mobile Broadband Wireless Access Systems Amendment for Physical and Medium Access Control Layers for Combined Fixed and Mobile Operation in Licensed Bands", pp. 184-190, Sep. 2004.
Hang Zhang et al, "Clean up for Closed-Loop MIMO in H-ARQ MAP IE", IEEE P802.16e/D7 Broadband Wireless Access Working Group <http://ieee802.org/16>, pp. 1-6, Mar. 10, 2010.
3GPP, Radio Resource Control (RRC) protocol specification (3GPP TS 25331 version 6.3.0 Release 6), ETSI TS 125 331, ETSI, Sep. 2004, V6.3.0, p49, 202-209, 220, 221, 406, 579-585, 589, 930.

Ericsson, Discussion on SIR Measurement, TSG-RAN Working Group 4 (Radio) meeting #18, 3GPP, Jul. 9, 2001, R4-010895, URL, http://www.3gpp._org/ftp/tsg_ran/WG4_Radio/TSGR4_18/Docs/R4-010895.zip.
Supplementary European Search Report—EP04713438, Search Authority—The Hague Patent Office, Nov. 30, 2010.
TIM/TILAB, BIU, Mobilkom Austria, One2one,Telefonica, Re-introduction of SIR measurement, 3GPP TSG-RAN4 Meeting #17,3GPP. May 21, 2001, R4-010647, URL, http://www.3gpp.org/ftp/tsg_ran/WG4_Radio/TSGR4_17/Docs/R4-010647.Zip.
Translation of Office Action in Chinese application 200680047991.2 corresponding to U.S. Appl. No. 11/608,785, citing CN1604685 dated Dec. 31, 2010.
Translation of Office Action in Japan application 2008-547460 corresponding to U.S. Appl. No. 11/333,771, citing WO2005125049 and JP2001007761 dated Mar. 15, 2011.
Translation of Office Action in Japan application 2010-275603 corresponding to U.S. Appl. No. 11/251,069, citing JP003018641A 3GPP_ETSI_TS_125_year_2004, TIM/TILAB_R4-010647_year_2001 and Ericsson_R4_010895_year_2001 dated Feb. 8, 2011.
Translation of Office Action in Japanese application 2008-535738 corresponding to U.S. Appl. No. 11/486,714, citing JP2007514378, JP2003510887 and WO9623371 dated Nov. 16, 2010.
Translation of Office Action in Japanese application 2008-535739 corresponding to U.S. Appl. No. 11/549,611, citing JP2003244161, JP200277992 and JP2001016152 dated Jan. 18, 2011.
Translation of Office Action in Ukraine application 200508984 corresponding to U.S. Appl. No. 11/748,433, citing US20020160802, WO0232183, RU2181529,.WO9845967, EP1377100, US5867478, US20010007552, US6035000 and US5933421 dated Dec. 9, 2010.
Translation of Office Action in Ukraine Application 201010406 corresponding to U.S. Appl. No. 11/748,433, citing US5867478 ,US20010007552 ,US6035000 ,US5933421, WO02073831, WO02032183, RU2181529 and EP1377100 dated Feb. 22, 2011.
3GPP TSG RAN2#45bis. "EDCH Buffer Status Reporting," R2-050026, Sophia Antipolis, France, Jan. 10-14, 2005, URL: http://www.3gpp.org/ftp/tsg_ran/WG2_RL2/TSGR2_45bis/Dcs/R2-050026.zip.
3GPP TSG-RAN WG2 meeting #48. "Scheduling Information Contents," R2-051957, London, United Kingdom, Aug. 29, 2005, URL: http://3gpp.org/ftp/tsg_ran/WG2_RL2/TSGR2_48/Documents/R2-095517.zip.
Chang, Cheng-Ta: "Downlink Transmit Power Issues in a WCDMA Cellular System,"Dec. 14, 2004, p. 3, Fig. 1, Retrieved online: http://wintech.ee.nctu.edu.tw/handoff/MediaTek/Material/Wintech/1214/Downlink%20Transmit%20Power%20Issues%20in%20a%20WCDMA%20Cellular%20System.pdf.
European Search Report—EP11165270, Search Authority—Berlin Patent Office, Jun. 6, 2011.
Gunnarsson, G. et al.,"Location Trial System for Mobile Phones," Global Telecommunications Conference, 1998. GLOBECOM 98. The Bridge to Global Integration. IEEE, vol. 4, pp. 2211-2216, Nov. 8-12, 1998.
Hobfeld, T. et al., "Supporting Vertical Handover by Using a Pastry Peer-to-Peer Overlay Network," Fourth Annual IEEE International Conference on Pervasive Computing and Communications Workshops, 2006. Percom Workshops 2006. Mar. 13-17, 2006, pp. 163-167, p. 164, paragraph III, IEEE, Piscataway, NJ, USA, XP010910514, ISBN: 0-7695-2520-2.
LG Electronics Inc., "Relative Buffer Status Reporting," 3GPP TSG-RAN WG2 meeting #46bis, R2-050852, Apr. 4, 2005, pp. 1-3, URL, http://www.3gpp.org/ftp/tsg_ran/WG2_RL2/TSGR2_46bis/Documents/R2-050852.zip.
Samsung: "Uplink control signaling structure (Revision of R1-041086)," 3GPP TSG-RAN WG1 Meeting #38bis, Tdoc R1-041222, 3GPP, Sep. 20, 2004, URL: http://www.3gpp.org/ftp/tsg_ran/WG1_RL1/TSGR1_38bis/Dcs/R1-041222.zip.
Taiwan Search Report—TW095148233—TIPO—Oct. 19, 2012.
Taiwan Search Report—TW095148273—TIPO—Jul. 3, 2013.

* cited by examiner

METHODS AND APPARATUS RELATED TO SELECTING REPORTING ALTERNATIVE IN A REQUEST REPORT

RELATED APPLICATIONS

Claim of Priority Under 35 U.S.C. §120

The present application for patent is a Continuation-in-Part of patent application Ser. No. 11/333,792, filed on Jan. 17, 2006, titled "METHODS AND APPARATUS OF IMPLEMENTING AND/OR USING A DEDICATED CONTROL CHANNEL", pending, which claims priority to Provisional Application No. 60/752,973, filed on Dec. 22, 2005, titled "COMMUNICATIONS METHODS AND APPARATUS", and assigned to the assignee hereof and each of which is hereby expressly incorporated by reference.

FIELD OF THE INVENTION

The present invention relates to wireless communications methods and apparatus and, more particularly, to methods and apparatus related to selecting a reporting alternative, for example, a reporting alternative for an uplink traffic request report.

BACKGROUND

In multiple access wireless communications systems, multiple wireless terminals are typically in competition for limited air link resources. A wireless terminal, operating in a state supporting uplink traffic signaling, typically needs to communicate control information to a base station attachment point. The information may be communicated in the form of one or more control information reports which allow the base station attachment point to characterize the wireless terminal and allocate resources such as uplink transmission resources.

A wireless terminal may support uplink traffic corresponding to a plurality of different types of applications. At different times the wireless terminal may have different traffic channel reporting needs. Accordingly, there is a need for methods and apparatus which would allow for a variety of reporting alternatives. For example, in systems which used a fixed bit size request report format, it would be beneficial if reporting alternatives corresponding to different groupings of traffic could be supported without changing the number of bits used for a report. In addition, assuming methods and apparatus for supporting reporting alternatives were developed, it would also be beneficial if methods and/or apparatus which could be used to select between available reporting alternatives could also be developed and/or supported. Improvements in reporting, and/or selection between reporting alternatives, if available, could facilitate efficient air link resource allocation and/or help to satisfy a wireless terminal's changing traffic needs and/or quality of service requirements.

SUMMARY

Various embodiments are directed to methods and apparatus for supporting a plurality of reporting alternatives, e.g., for a fixed size report. Some features are related to selecting a reporting alternative for a control information request report, e.g., an uplink traffic report which provides information on the amount of data waiting at a communications device to be transmitted. In some embodiments priority levels used in the selecting are predetermined. In some embodiments, priority levels used in the selecting are determined dynamically. Such a report may be viewed and/or interpreted as a request for uplink transmission resources and is therefore sometimes referred to as an uplink request report.

In some but not necessarily all embodiments a wireless terminal uses an N bit size, e.g., 4 bit size, uplink traffic channel request report having a mapping definition corresponding to each of the $2^N$ distinct possible N bit bit patterns. In at least one such embodiment the wireless terminal includes a plurality of different request groups, each request group corresponding to a grouping of uplink traffic, e.g., traffic stored in one or a set of corresponding uplink traffic queues. The communications device keeps track of the information corresponding to the different request groups that is waiting to be communicated and maintains statistics on the different request groups, e.g., counts of frames of backlog. In some exemplary implementations, a request report format is structured to provide reporting alternatives associated with different request groups, e.g., reporting alternative A, if selected, allows the wireless terminal to communicate backlog information about request group 1; reporting alternative B, if selected, allows the wireless terminal to communicated combined backlog information about both request group 2 and request group 3; and reporting alternative C, if selected, allows the wireless terminal to communicate backlog information about request group 4. Different reporting alternatives correspond to different subsets of the $2^N$ possible N bit mappings, where the subsets are non-overlapping. In some embodiments, the wireless terminal uses priority information associated with the different request groups, e.g., predetermined priority information, to select a reporting alternative. In some embodiments, priorities associated with at least some of the different request groups are calculated by the wireless terminal and change over time, e.g., as a function of transmission deadline information associated with packets in a queue. Thus, by selecting between the different reporting alternatives, the communications device can provide backlog information on one or more different request groups using an n-bit report.

An exemplary method of operating a wireless terminal in a wireless communications system to communicate transmission backlog information in accordance with various embodiments comprises: selecting one of a plurality of reporting alternatives, at least some of said reporting alternatives corresponding to different request groups, said different reporting alternatives being part of a report format for an n-bit size uplink request report, said report format defining a plurality of different n-bit mappings where n is a positive integer. The exemplary method, in some embodiments, further includes generating an uplink request report, said generating including mapping backlog information in accordance with the selected reporting alternative to obtain an n-bit information bit pattern to be included in a generated uplink request report. The generated report may then be transmitted, e.g., over a wireless communications link to, e.g., a base station responsible for assigning uplink resources which can be used to transmit the queued data.

Another exemplary method of operating a wireless terminal in a wireless communications system in accordance with various embodiments comprises: determining transmission deadline information corresponding to at least some of a plurality of different request groups including queued traffic and dynamically calculating a scheduling priority for each of said at least some of a plurality of different request groups for which transmission deadline information was determined. The method may, and sometimes does, further include selecting one of a plurality of reporting alternatives, said selected one of the reporting alternatives being a reporting alternative corresponding to the request group determined to have the highest priority. In some embodiments the method further includes transmitting an uplink request report including backlog information corresponding to the request group determined to have the highest priority where the transmitted uplink request report being in accordance with the selected reporting alternative.

Various embodiments are also directed to wireless terminals. One exemplary wireless terminal is intended for use in a wireless communications system and communicates transmission backlog information to a base station using one of a plurality of supported reporting alternatives. The exemplary wireless terminal includes a selection module for selecting one of a plurality of reporting alternatives, at least some of said reporting alternatives corresponding to different request groups, said different reporting alternatives being part of a report format for an n-bit size uplink request report, said report format defining a plurality of different n-bit mappings where n is a positive integer. The exemplary wireless terminal also includes, in some implementations, a report generation module for generating an uplink request report, said generating including mapping backlog information in accordance with the selected reporting alternative to obtain an n-bit information bit pattern to be included in a generated uplink request report and a transmitter for transmitting the generated uplink request report to thereby communicate transmission backlog information.

In another embodiment, the exemplary wireless terminal includes a transmission deadline determination module for determining transmission deadline information corresponding to at least some of a plurality of different request groups including queued traffic. In such an embodiment, the wireless terminal may also include a transmission scheduling module for dynamically calculating a scheduling priority for each of said at least some of a plurality of different request groups for which transmission deadline information is determined. The exemplary wireless terminal may, and sometimes does, also include a report selection module for selecting one of a plurality of reporting alternatives, said selected one of the reporting alternatives being a reporting alternative corresponding to the request group determined to have the highest priority. In order to communicate a generated report, the wireless terminal may, and sometimes does, also include a transmitter for transmitting an uplink request report including backlog information corresponding to the request group determined to have the highest priority, said transmitted uplink request report being in accordance with the selected reporting alternative.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

DETAILED DESCRIPTION

Figure 1:
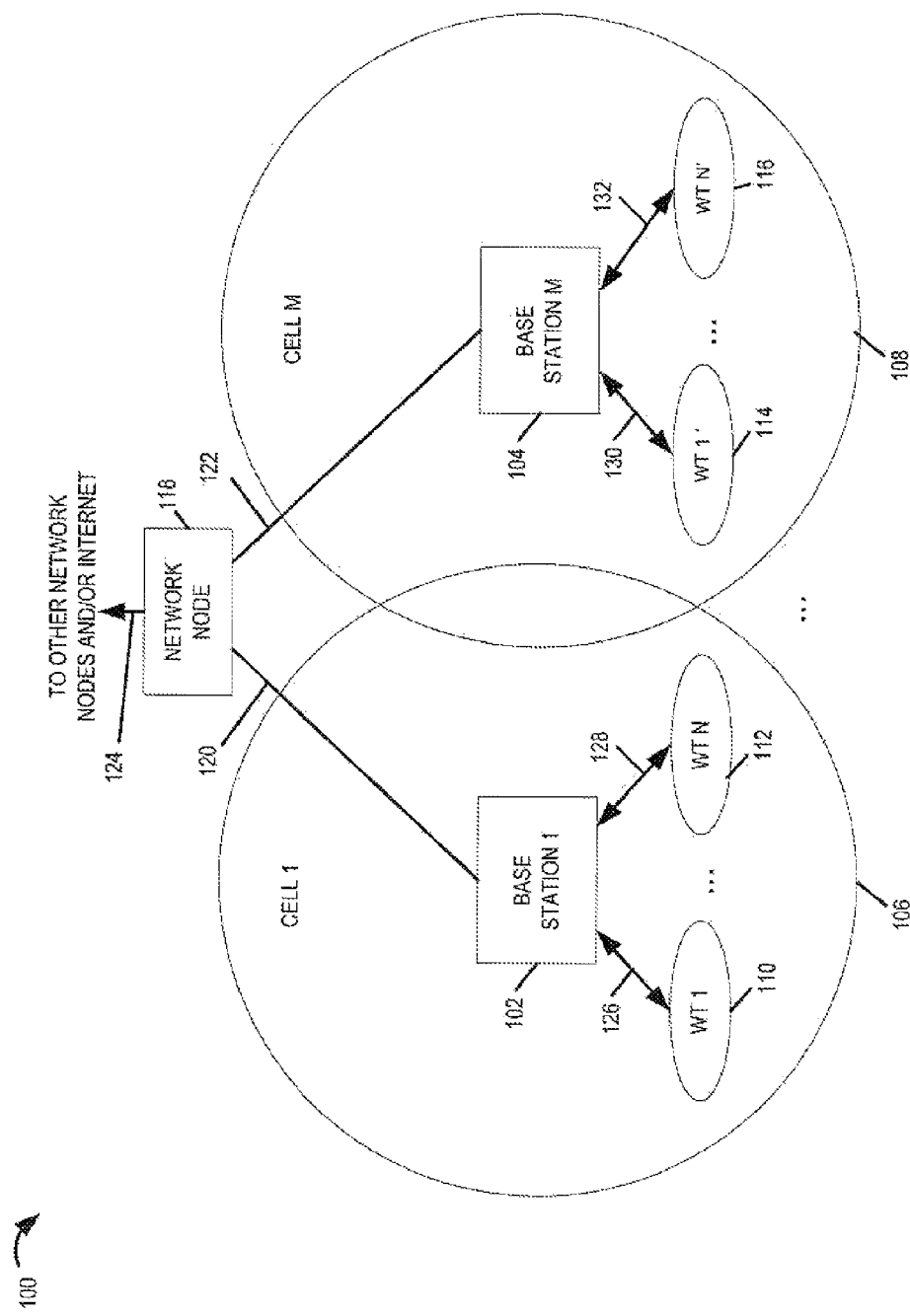
FIG. 1 is drawing of an exemplary wireless communications system implemented in accordance with various embodiments.

FIG. 1 is drawing of an exemplary wireless communications system 100 implemented in accordance with various embodiments. Exemplary wireless communications system 100 is, e.g., an orthogonal frequency division multiple (OFDM) multiple access wireless communications system using a dedicated control channel uplink reporting structure including at least some fixed size multi-bit request reports. The fixed bit size request reports can be used to report transmission backlog information, e.g., the number of frames of information waiting to be transmitted with regard to a queue or set of queues. A backlog report may provide information on one or more request groups where different request groups correspond to different queues or sets of queues which can be used to store information to be transmitted.

Exemplary wireless communications system 100 includes a plurality of base stations (base station 1 102, . . . , base station M 104). Each base station (102, 104) has a corresponding wireless coverage area (cell 1 106, cell M 108), respectively. System 100 also includes network node 118 which is coupled to base stations (102, 104) via network links (120, 122), respectively. Network node 118 is also coupled to other network nodes and/or the Internet via link 124. Network links (120, 122, 124) are, e.g., fiber optic links. System 100 may also include cells with multiple sectors and/or cells using multiple carriers.

System 100 also includes a plurality of wireless terminals. At least some of the wireless terminals are mobile nodes which may move throughout the communication system. In FIG. 1, wireless terminals (WT 1 110, WT N 112) are located in cell 1 106 and coupled to base station 1 102 via wireless links (126, 128), respectively. In FIG. 1, wireless terminals WT 1' 114, WT N' 116) are located in cell M 108 and coupled to base station M 104 via wireless links (130, 132), respectively. In accordance with various embodiments, at least some of the wireless terminals use a request report format, e.g., for a fixed bit size uplink traffic channel request report, allowing the wireless terminal to select, for a request report to be transmitted, between reporting alternatives, said reporting alternative corresponding to at least two different request groups. For example, an exemplary 4 bit uplink traffic channel request report format may include 16 distinct bit patterns, and a first subset of the 16 bit mapping patterns may be associated with mapping request group 1 frame count backlog information, while a second subset of the 16 bit mapping patterns may be associated with mapping request group 2 and request group 3 frame count backlog information jointly coded, said first and second subsets being non-overlapping. Continuing with the example, assuming the wireless terminal has non-zero backlog counts in both (i) request group 1 and (ii) at least one of request 2 and request group 3, the wireless terminal selects an alternative to report, e.g., as a function of priority information and/or transmission deadline information.

Figure 2:
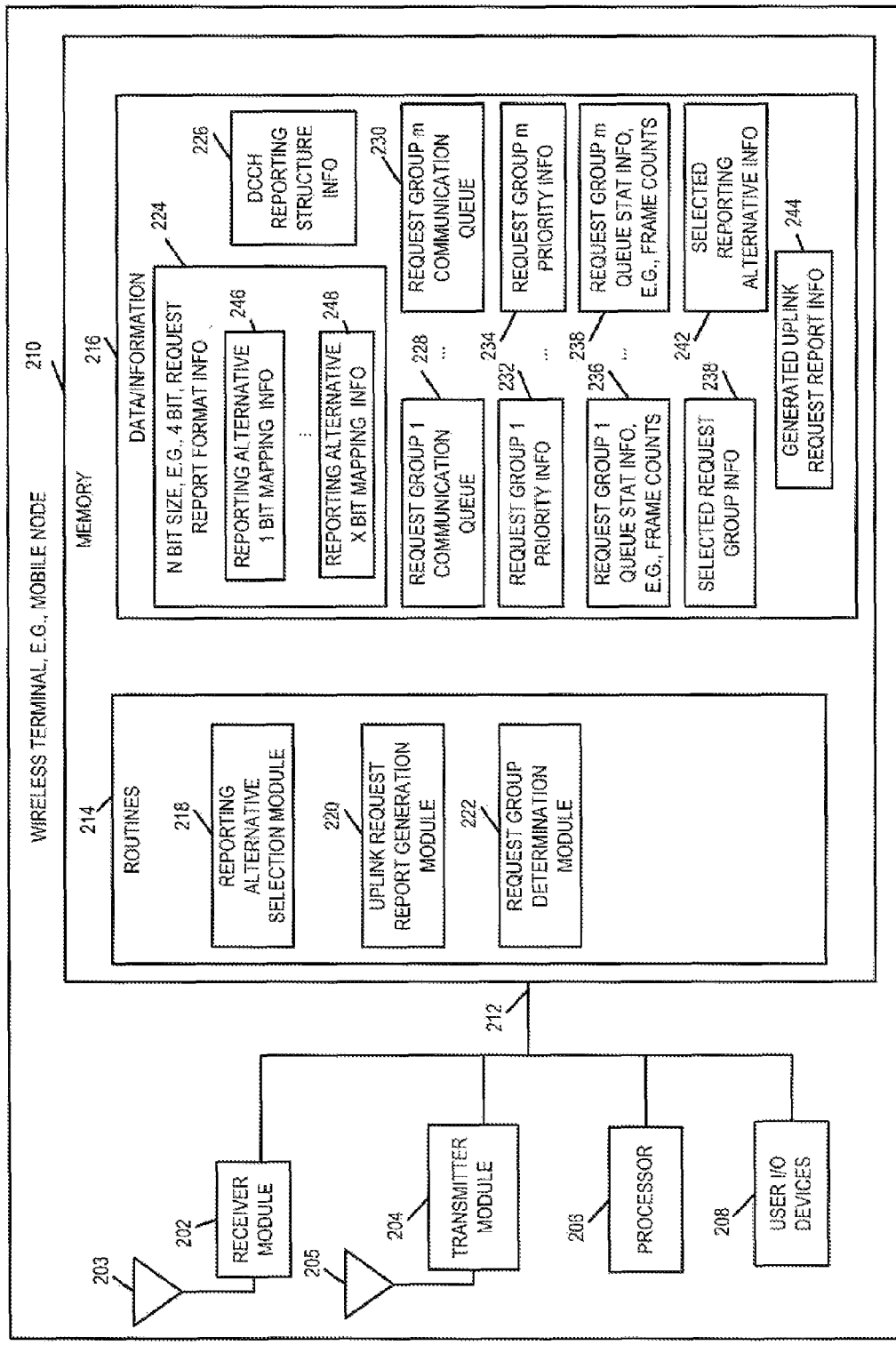
FIG. 2 is a drawing of an exemplary wireless terminal, e.g., mobile node, in accordance with various embodiments.

FIG. 2 is a drawing of an exemplary wireless terminal 200, e.g., mobile node, in accordance with various embodiments. Exemplary wireless terminal 200 communicates transmission backlog information to a base station, e.g., transmission backlog information for uplink traffic that the wireless terminal intends to transmit corresponding to different request groups. Exemplary wireless terminal 200 includes a receiver module 202, a transmitter module 204, a processor 206, user I/O devices 208, and a memory 210 coupled together via a bus 212 over which the various elements interchange data and information. Memory 210 includes routines 214 and data/information 216. The processor 206, e.g., a CPU, executes the routines 214 and uses the data/information 216 in memory 210 to control the operation of the wireless terminal 200 and implement methods.

Receiver module 202, e.g., an OFDM receiver, is coupled to receive antenna 203 via which the wireless terminal 200 receives downlink signals from base stations. Transmitter module 204, e.g., an OFDM transmitter, is coupled to transmit antenna 205, via which the wireless terminal transmits uplink signals to base stations. The uplink signals include dedicated control channel segment signals. At least some of the dedicated control channel segment signals convey uplink traffic channel request reports, e.g., a 4 bit uplink traffic channel request report. Transmitter module 204 transmits generated uplink request reports to thereby communicate transmission backlog information. In some embodiments, the same antenna is used for receiver and transmitter.

User I/O device 208, e.g., keyboard, keypad, camera, microphone, switches, display, speaker, etc., allow a user of wireless terminal 200 to input data/information, to obtain output data/information, and to control at least some functions of the wireless terminal. For example, via I/O device interface 208, a user may initiate or terminate a communication session and/or an application.

Routines 214 include a reporting alternative selection module 218, an uplink request report generation module 220, and a request group determination module 222. The reporting alternative selection module 218 selects one of a plurality of reporting alternatives, at least some of said reporting alternatives corresponding to different request groups, said different reporting alternatives being part of a report format for an n-bit size uplink request report, said report format defining a plurality of n-bit mappings where n is a positive integer. Uplink request report generation module 220 generates an uplink request report, said generating including mapping backlog information in accordance with the selected reporting alternative to obtain an n-bit information bit pattern to be included in a generated uplink request report. In some embodiments, the generated uplink request report is a multi-bit uplink request report in a dedicated control channel reporting structure.

Request group determination module 222 determines a selected request group, said selected request group having the highest priority level among the request groups that have non-zero backlog and can be reported by the uplink request report. The selection of the request groups determination module 222 is used by reporting alternative selection module 218 as an input. In some embodiments, selecting one of the reporting alternatives selects a reporting alternative that conveys backlog information corresponding to the selected request group. In some such embodiments, the selected reporting alternative report backlog information corresponding to at least two request groups, the information corresponding to the two request groups being jointly coded in the generated report.

Data/information 216 includes an N bit size, e.g., 4 bit, request report format information 224, dedicated control channel reporting structure information 226, a plurality of request group communication queues (request group 1 communication queue 228, . . . , request group m communication queue 230), a plurality of corresponding request group priority information (request group 1 priority information 232, . . . , request group m priority information 234), a plurality of corresponding request group queue statistics information (request group 1 queue stats info 236, e.g., frame counts of backlog, . . . , request group m queue stats info 238, e.g., frame counts of backlog), selected request group information 238, selected reporting alternative information 242, and generated uplink request report information 244.

N bit size request report format information 224 includes information defining said plurality of different n-bit mappings, said plurality of different n-bit mappings includes $2^n$ or fewer mappings. For example, in one exemplary embodiment where N=4, there are 16 different mappings, and a first subset of those mapping is associated with a first reporting alternative, while a second subset of those mappings is associated with a second reporting alternative, said first and second subsets being non-overlapping. N bit size request report format information 224 includes a plurality of reporting alternative bit mapping information sets (reporting alternative 1 bit mapping information 246, . . . , reporting alternative X bit mapping information 248).

Dedicated control channel (DCCH) reporting structure information 226 includes information identifying DCCH logical channel tones, DCCH segments, mapping of different types of reports to segments, and associated timing in a recurring reporting structure. The different types of reports in the DCCH reporting structure include a request report type in accordance with the N bit size request report format information 224.

Request groups communication queues (request group 1 communication queue 228, . . . request group m communication queue 230) are a plurality of communication queues for storing data to be transmitted, where each request group corresponds to one communication queue. In some embodiments, at least some of the different request groups correspond to a set of communication queues. Request group priority information (request group 1 priority information 232, . . . , request group m priority information 234) are stored request group priority information associated with the different request groups. Selection of a reporting alternative is performed as a function of request group priority information. In various embodiments the request group priorities are predetermined. Request groups queue status information (request group 1 queue status info 236, . . . , request group m queue status info 238) includes, e.g., frame counts of backlog, e.g., MAC frame counts of backlog, corresponding to (request group 1 communication queue 228, . . . , request group m communication queue 230), respectively. Request group determination module 222, uses the queue stats info (236, . . . , 238) in determining a selected request group. For example, if a particular request group has a zero frame count, indicating no backlog of uplink traffic corresponding to the request group, that particular request group is removed from consideration.

Selected request group information 238, an output of module 222 and an input to module 218, is, e.g., an identifier identifying which of the m request groups has been selected by request report determination module 222. Selected reporting alternative information 242, an output of module 218 and an input of module 220, is, e.g., an identifier identifying one of the X reporting alternatives in accordance with request report format information 224. Generated uplink request report information 244 is an output of report generation module 220. For example, if the uplink request report is a four bit uplink request report, the report is one of 16 different bit patterns.

Figure 3:
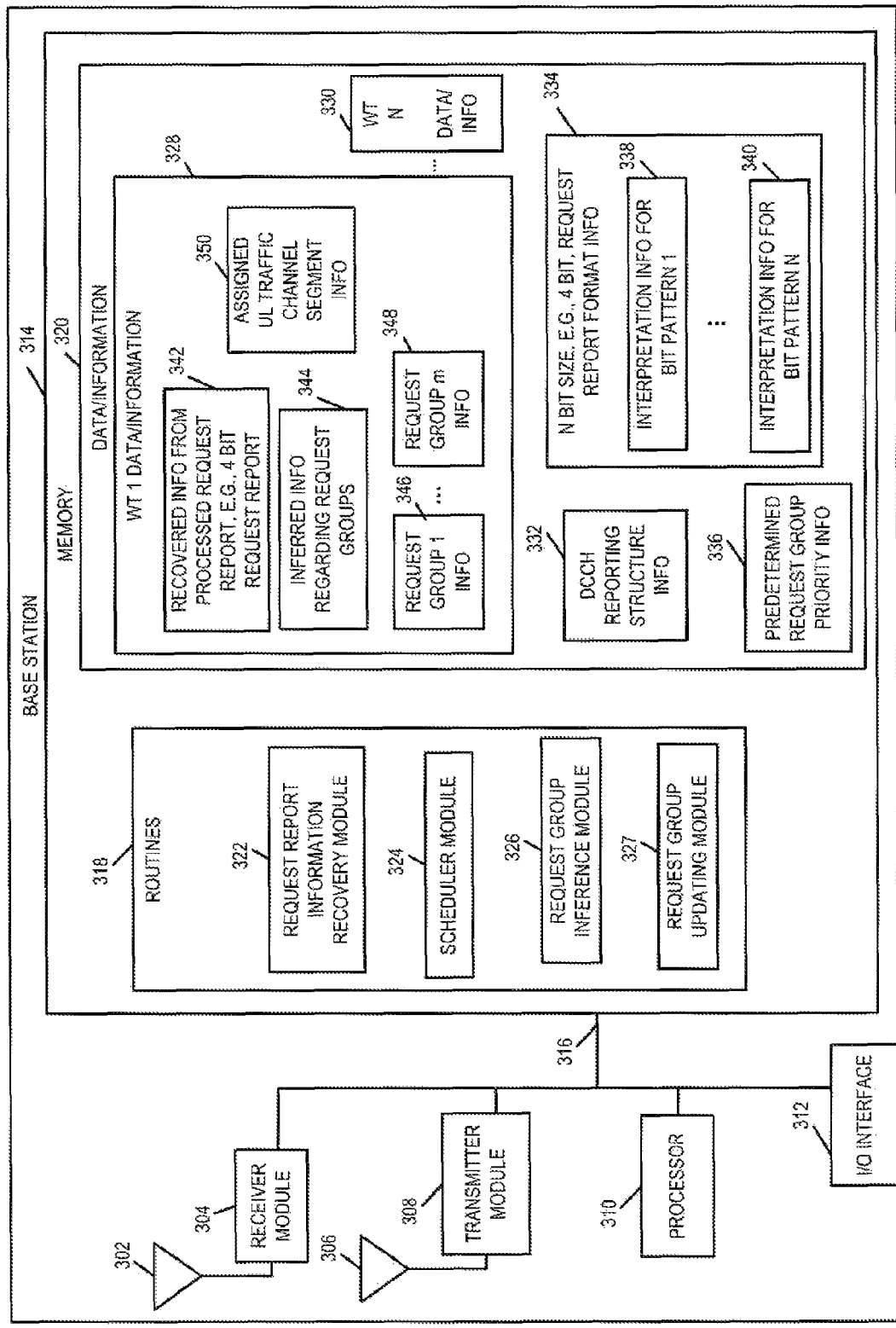
FIG. 3 is a drawing of an exemplary base station in accordance with various embodiments.

FIG. 3 is a drawing of an exemplary base station 300 in accordance with various embodiments. Exemplary base station 300 may be any of the exemplary base stations (BS 1 102, . . . , BS M 104) of system 100 of FIG. 1. Base station 300 includes a receiver module 304, a transmitter module 308, a processor 310, an I/O interface 312, and a memory 314 coupled together via a bus 316 over which the various elements may interchange data and information. Memory 314 includes routines 318 and data/information 320. The processor 310, e.g., a CPU, executes the routines 318 and uses the data/information in memory 314 to control the operation of the base station and implement methods.

Receiver module 304, e.g., an OFDM receiver, is coupled to receive antenna 302 via which the base station 300 receives uplink signals from wireless terminals, said received uplink signals including dedicated control channel segment signals at least some of the dedicated control channel segment signal conveying traffic channel request reports. Received uplink signals also include traffic channel segment signals. Transmitter module 308, e.g., an OFDM transmitter, is coupled to transmit antenna 306 via which the base station transmits downlink signals to wireless terminals, said downlink signals including assignment signals conveying assignments for uplink traffic channel segments. I/O interface 312 couples the base station to other network node, e.g., other base stations and/or the Internet. Thus I/O interface 312, by coupling the base station 300 to a backhaul network allows a wireless terminal using an attachment point of base station 300 to participate in a communications session with a peer node, e.g., another wireless terminal, using a different base station as its point of network attachment.

Routines 318 include a request report information recovery module 322, a scheduler module 324, a request group inference module 326 and a request group updating module. Request report information recovery module 322 uses data/information 320 including N bit size request report format information 334 to obtain recovered information from a received request report, e.g., a 4 bit request report for traffic channel resources communicated in an uplink dedicated control channel segment. For example corresponding to WT 1, the recovered information includes recovered information from processed request report 342. The information bits of the request report may be one of a plurality, e.g., 16, of different patterns, and the particular bit pattern is interpreted to mean that one request group or a set of request groups has a certain number of frames in backlog or has a number of frames within a range in its backlog. For example consider an example where the request report format corresponds to that of FIG. 11, bit pattern=0010 may signify that request group 2 has 2 or 3 frames in its backlog waiting to be transmitted.

Scheduler module 324 schedules uplink and downlink traffic channel segments to wireless terminals. For example, scheduler module 324 schedules uplink traffic channel segments in response to received requests communicated in fixed bit size uplink traffic channel request reports, e.g., ULRQST4 reports, from wireless terminals in an On-state of operation using the base station 300 as a current point of network attachment. Assigned uplink traffic channel segment information 350 corresponds to scheduler 324 assignments for WT 1, e.g., information identifying particular indexed uplink traffic channel segments assigned to WT 1.

Request group inference module 326 performs inferences about request groups not directly reported in the received request report. For example, consider that the predetermined request group priority information identifies that request group 2 has a higher predetermined priority than request group 1 or request group 3, and the reporting rules are such that a wireless terminal reports the backlog of the highest priority group with non-zero backlog. If in such a situation, the base station received a report which conveyed information about the combination of request group 1 and request group 3, the base station could infer that request group 2 has a current zero backlog.

Request group updating module 327 uses the recovered information, e.g., info 342, obtained from recovery module 322 and the inferred information, e.g., info 344, obtained from inference module 326 to update the set of request group information corresponding to the wireless terminal, e.g., (request group 1 information 346, . . . , request group m information 348). For example, request group updating module 327 loads new request group frame counts, modifies request frame counts, and/or clears request group counts with regard to one or more of request group information sets, e.g., (request group 1 information 346, . . . , request group m information 348).

Data/information 320 includes a plurality of sets of wireless terminal data/information (WT 1 data/information 328, . . . , WT N data/information 330), dedicated control channel reporting structure information 332, N bit size request report format information 334, and predetermined request group priority information 336. WT 1 data/information 328 includes recovered information from processed request report 342, inferred information regarding request groups 344, a plurality of set of request group information (request group 1 information 346, . . . , request group m information 348), and assigned uplink traffic channel segment information 350.

N bit size, e.g., 4 bit size, report format information 334 includes interpretation information for a plurality of bit patterns (interpretation information for bit pattern 1 338, . . . , interpretation information for bit pattern N 340). For example in one exemplary embodiment, where N=4 there are 16 distinct bit patterns (0000, 0001, . . . , 1111) where each bit pattern has a different interpretation of the information being conveyed in the report.

Predetermined request group priority information 336 includes information associating different uplink traffic request groups with different predetermined priorities. In some embodiments, different wireless terminals have different priorities orderings associated with the request groups being used.

Dedicated control channel (DCCH) reporting structure information 332 includes information identifying DCCH logical channel tones, DCCH segments, mapping of different types of reports to segments, and associated timing in a recurring reporting structure. The different types of reports in the DCCH reporting structure include a request report type in accordance with the N bit size request report format information 334.

Figure 4:
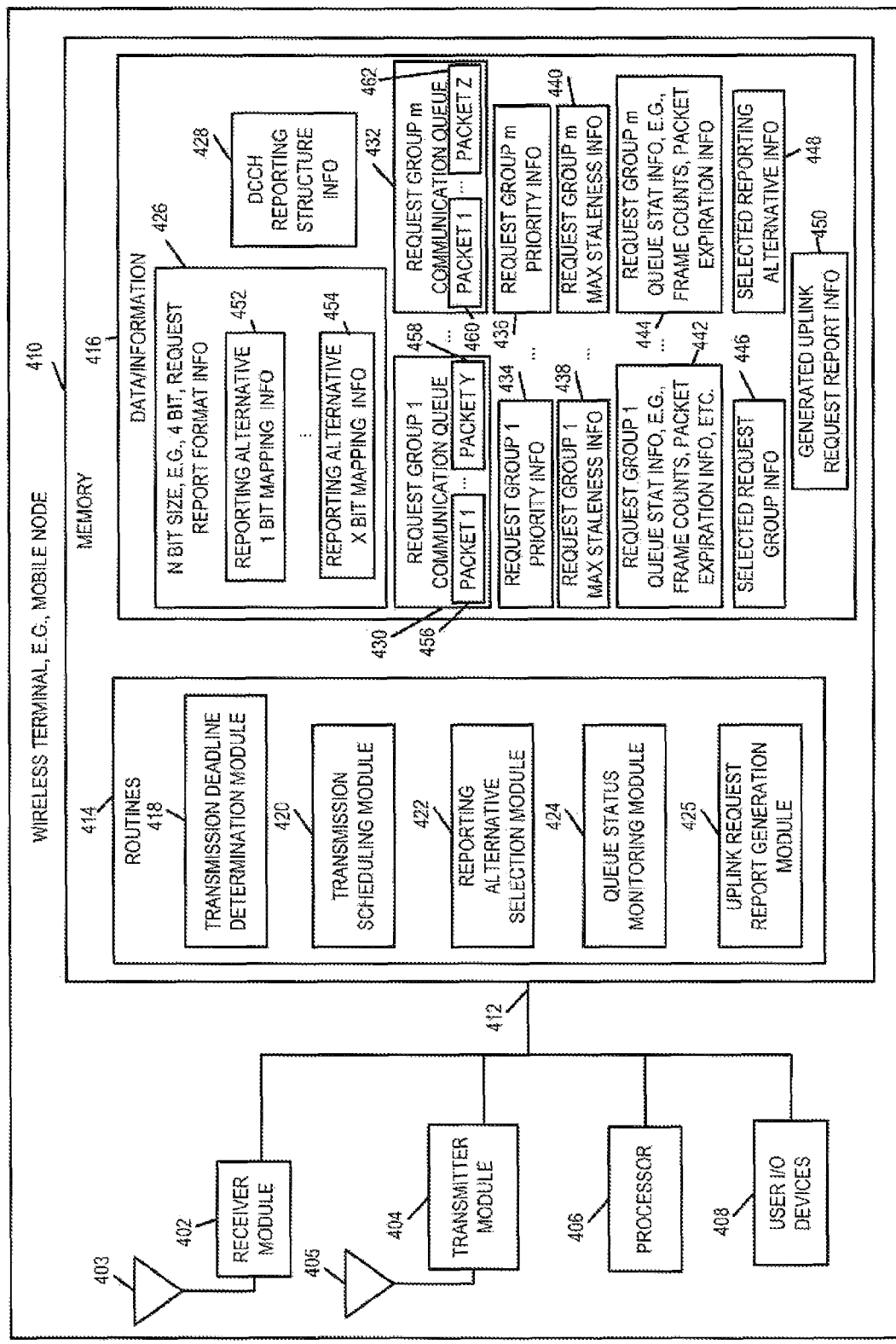
FIG. 4 is a drawing of an exemplary wireless terminal, e.g., mobile node, in accordance with various embodiments.

FIG. 4 is a drawing of an exemplary wireless terminal 400, e.g., mobile node, in accordance with various embodiments. Exemplary wireless terminal 400 communicates transmission backlog information to a base station, e.g., transmission backlog information for uplink traffic that the wireless terminal intends to transmit corresponding to different request groups. Exemplary wireless terminal 400 includes a receiver module 402, a transmitter module 404, a processor 406, user I/O devices 408, and a memory 410 coupled together via a bus 412 over which the various elements interchange data and information. Memory 410 includes routines 414 and data/information 416. The processor 406, e.g., a CPU, executes the routines 414 and uses the data/information 416 in memory 410 to control the operation of the wireless terminal 400 and implement methods.

Receiver module 402, e.g., an OFDM receiver, is coupled to receive antenna 403 via which the wireless terminal 400 receives downlink signals from base stations. Transmitter module 404, e.g., an OFDM transmitter, is coupled to transmit antenna 405, via which the wireless terminal transmits uplink signals to base stations. The uplink signals include dedicated control channel segment signals. At least some of the dedicated control channel segment signals convey uplink traffic channel request reports, e.g., a 4 bit uplink traffic channel request report. Transmitter module 404 transmits generated uplink request reports to thereby communicate transmission backlog information. For example, the transmitter module 404 transmits an uplink request report including backlog information corresponding to the request group determined to have the highest priority, said transmitted uplink request report being in accordance with the selected reporting format. In some embodiments, the same antenna is used for receiver and transmitter.

User I/O device 408, e.g., keyboard, keypad, camera, microphone, switches, display, speaker, etc., allow a user of wireless terminal 400 to input data/information, to obtain output data/information, and to control at least some functions of the wireless terminal. For example, via I/O device interface 408, a user may initiate or terminate a communications session and/or an application.

Routines 414 include a transmission deadline determination module 418, a transmission scheduling module 420, a reporting alternative selection module 422, a queue status monitoring module 424, and an uplink request report generation module 425. The transmission deadline determination module 418 determines transmission deadline information corresponding to at least some of a plurality of different request queues included queued traffic. Transmission scheduling module 420 dynamically calculates a scheduling priority for each of at least some of a plurality of different request groups for which transmission deadline information was determined. Reporting alternative selection module 422 selects one of a plurality of reporting alternatives, said selected one of the reporting alternative being a reporting alternative corresponding to the request groups determined to have the highest priority. In some embodiments, the reporting alternative selection module 422 selects one of a plurality of which reports backlog information corresponding to the request group having the highest calculated priority, e.g., calculated as a function of determined transmission deadline information. In some embodiments, some of the reporting alternatives may correspond to a request group whose priority is independent of determined transmission deadline information. For example, in some embodiments, one request group may assume the highest priority if it has a non-zero backlog count. Queue status monitoring module 424 determines which of a plurality of different request groups have queued traffic. Uplink request report generation module 425 generates an N bit size uplink request report in accordance with request report format information 426 using the reporting alternative including the selected request group having the determined highest priority and communicating request group backlog information, e.g., frame count information, corresponding to that request group.

Data/information 416 includes an N bit size, e.g., 4 bit, request report format information 426, dedicated control channel reporting structure information 428, a plurality of request group communication queues (request group 1 communication queue 430, . . . , request group m communication queue 432), a plurality of corresponding request group priority information (request group 1 priority information 434, . . . , request group m priority information 436), a plurality of request group maximum staleness information (request group 1 max staleness info 438, . . . , request group m maximum staleness info 440), a plurality of corresponding request group queue statistics information (request group 1 queue stats info 442, . . . , request group m queue stats info 444, selected request group information 446, selected reporting alternative information 448, and generated uplink request report information 450.

N bit size request report format information 426 includes information defining said plurality of different n-bit mappings, said plurality of different n-bit mappings includes $2^n$ or fewer mappings. For example, in one exemplary embodiment where N=4, there are 16 different mappings, and a first subset of those mapping is associated with a first reporting alternative, while a second subset of those mappings is associated with a second reporting alternative, said first and second subsets being non-overlapping. N bit size request report format information 452 includes a plurality of reporting alternative bit mapping information sets (reporting alternative 1 bit mapping information 452, . . . , reporting alternative X bit mapping information 454).

Dedicated control channel (DCCH) reporting structure information 428 includes information identifying DCCH logical channel tones, DCCH segments, mapping of different types of reports to segments, and associated timing in a recurring reporting structure. The different types of reports in the DCCH reporting structure include a request report type in accordance with the N bit size request report format information 426.

Request groups communication queues (request group 1 communication queue 430, . . . request group m communication queue 432) are a plurality of communication queues for storing data to be transmitted, where each request group corresponds to one communication queue. Request group 1 communication queue 430 includes a plurality of packets to be transmitted (packet 1 456, . . . packet Y 458). similarly, request group m communication queue 432 includes a plurality of packets to be transmitted (packet 1 460, . . . packet Z 462) In some embodiments, at least some of the different request groups correspond to a set of communication queues. Request group priority information (request group 1 priority information 434, . . . , request group m priority information 434) includes stored request group priority information currently associated with the different request groups. At least some of the reporting priorities corresponding to request groups vary over time as a function of determined transmission deadline information. For example, a priority level associated with a particular request group corresponding to time sensitive traffic, e.g., gaming traffic, changes as a function of the remaining time a packet stored in its corresponding queue has until it will be discarded if not transmitted. Selection of a reporting alternative is performed as a function of request group priority information.

Request group maximum staleness information (request group 1 maximum staleness information 438, . . . , request group m maximum staleness information 440) includes criteria, e.g., a maximum time limit that a packet deposited in a particular request group queue should be allowed to remain if not transmitted before being dropped. For example, a request group queue corresponding to voice traffic typically has a smaller max time to discard value than a request group corresponding to a gaming application. Request groups queue stats information (request group 1 queue stats info 442, . . . , request group m queue stats info 444) includes, e.g., frame counts of backlog, e.g., MAC frame counts of backlog, and packet expiration information corresponding to (request group 1 communication queue 430, . . . , request group m communication queue 432), respectively. Packet expiration information is, in some embodiments, determined by transmission deadline determination module 418

Selected request group information 446, an output of transmission scheduling module 420 and an input to reporting alternative selection module 422, is, e.g., an identifier identifying which of the m request groups has been determined to have the highest priority. Selected reporting alternative information 448, an output of module 422 and an input of uplink request report generation module 425, is, e.g., an identifier identifying one of the X reporting alternatives in accordance with request report format information 426.

Generated uplink request report information 450 is an output of uplink report generation module. For example, if the uplink request report is a four bit uplink request report, the report is one of 16 alternative bit patterns.

Figure 5:
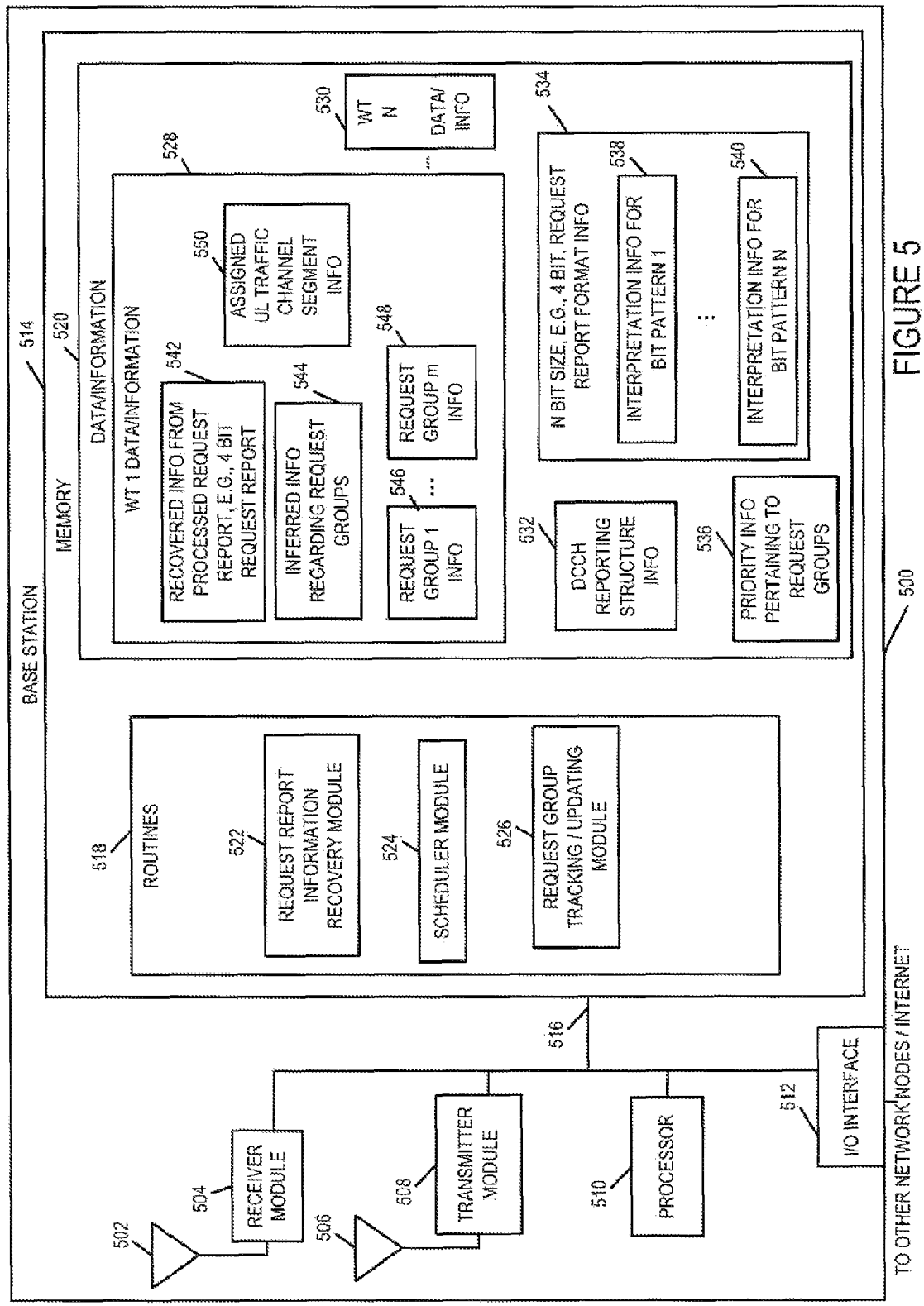
FIG. 5 is a drawing of an exemplary base station in accordance with various embodiments.

FIG. 5 is a drawing of an exemplary base station 500 in accordance with various embodiments. Exemplary base station 500 may be any of the exemplary base stations (BS 1 102, . . . , BS M 104) of system 100 of FIG. 1. Base station 500 includes a receiver module 504, a transmitter module 508, a processor 510, an I/O interface 512, and a memory 514 coupled together via a bus 516 over which the various elements may interchange data and information. Memory 514 includes routines 518 and data/information 520. The processor 510, e.g., a CPU, executes the routines 518 and uses the data/information 520 in memory 514 to control the operation of the base station 500 and implement methods.

Receiver module 504, e.g., an OFDM receiver, is coupled to receive antenna 502 via which the base station 500 receives uplink signals from wireless terminals, said received uplink signals including dedicated control channel segment signals, at least some of the dedicated control channel segment signals conveying traffic channel request reports. Received uplink signals also include traffic channel segment signals. Transmitter module 508, e.g., an OFDM transmitter, is coupled to transmit antenna 506 via which the base station 500 transmits downlink signals to wireless terminals, said downlink signals including assignment signals conveying assignments for uplink traffic channel segments. I/O interface 512 couples the base station 500 to other network nodes, e.g., other base stations and/or the Internet. Thus I/O interface 512, by coupling the base station 500 to a backhaul network allows a wireless terminal using an attachment point of base station 500 to participate in a communications session with a peer node, e.g., another wireless terminal, using a different base station as its point of network attachment.

Routines 518 include a request report information recovery module 522, a scheduler module 524, and a request group tracking/updating module 526. Request report information recovery module 522 uses data/information 520 including N bit size request report format information 534 to obtain recovered information from a received request report, e.g., from a 4 bit request report for traffic channel resources communicated in an uplink dedicated control channel segment. For example corresponding to WT 1, the recovered information includes recovered information from processed request report 542. The information bits of the request report may be one of a plurality, e.g., 16, of different patterns, and the particular bit pattern is interpreted to mean that one request group or a set of request groups has a certain number of frames in backlog or has a number of frames within a range in its backlog. For example consider an example where the request report format corresponds to that of FIG.

15, bit pattern=1110 may signify that request group 2 has 23, 24, 25, 26, or 27 frames in its backlog waiting to be transmitted.

Scheduler module 524 schedules uplink and downlink traffic channel segments to wireless terminals. For example, scheduler module 524 schedules uplink traffic channel segments in response to received requests communicated in fixed bit size uplink traffic channel request reports, e.g., ULRQST4 reports, from wireless terminals in an On-state of operation using the base station 500 as a current point of network attachment. Assigned uplink traffic channel segment information 550 corresponds to scheduler 524 assignments for WT 1, e.g., information identifying particular indexed uplink traffic channel segments assigned to WT 1.

Request group tracking/updating module 527 uses the recovered information, e.g., info 542, obtained from recovery module 522 and the inferred information, e.g., info 544, to update the set of request group information corresponding to the wireless terminal, e.g., (request group 1 information 546, . . . , request group m information 548). For example, request group tracking/updating module 526 loads new request group frame counts, modifies request frame counts, and/or clears request group counts with regard to one or more of request group information sets, e.g., (request group 1 information 546, . . . , request group m information 548).

Data/information 520 includes a plurality of sets of wireless terminal data/information (WT 1 data/information 528, . . . , WT N data/information 530), dedicated control channel reporting structure information 532, N bit size request report format information 534, and priority information pertaining to request groups 536. WT 1 data/information 528 includes recovered information from processed request report 542, inferred information regarding request groups 544, a plurality of set of request group information (request group 1 information 546, . . . , request group m information 548), and assigned uplink traffic channel segment information 550.

N bit size, e.g., 4 bit size, report format information 534 includes interpretation information for a plurality of bit patterns (interpretation information for bit pattern 1 538, . . . , interpretation information for bit pattern N 540). For example in one exemplary embodiment, where N=4 there are 16 distinct bit patterns (0000, 0001, . . . , 1111) where each bit pattern has a different interpretation of the information being conveyed in the report.

Priority information pertaining to request groups 536 includes information associating at least some of the request groups for at least some of the wireless terminals with variable priorities which are calculated by the wireless terminal as a function of determined transmission deadline information. In some embodiments, at least some of the wireless terminals have request groups with predetermined overriding priority, e.g., one request group may be allocated the highest priority if it has any frames in its backlog; another request group may be allocated the lowest priority. This priority information 536 may be used by the request group tracking/updating module 526. For example, the wireless terminal recognizes that the received request report conveyed queue statistics corresponding to the predetermined overriding priority request group, and the wireless terminal, based on past request information, in some embodiments, extrapolates a request for at least one other request group.

Dedicated control channel (DCCH) reporting structure information 532 includes information identifying DCCH logical channel tones. DCCH segments, mapping of different types of reports to segments, and associated timing in a recurring reporting structure. The different types of reports in the DCCH reporting structure include a request report type in accordance with the N bit size request report format information 534.

Figure 6:
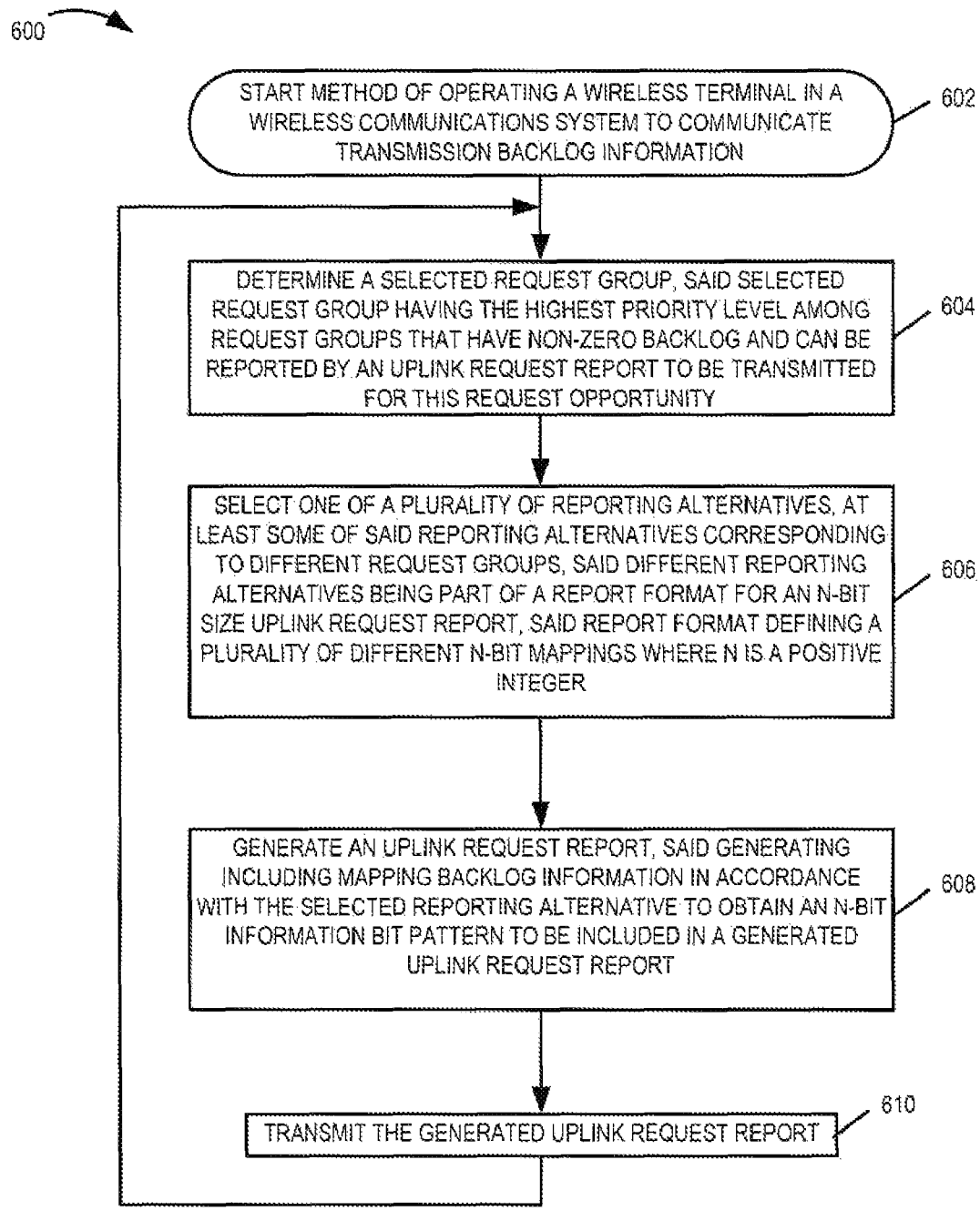
FIG. 6 is a drawing of a flowchart of an exemplary method of operating a wireless terminal in a wireless communications system to communicate transmission backlog information.

FIG. 6 is a drawing of a flowchart 600 of an exemplary method of operating a wireless terminal in a wireless communications system to communicate transmission backlog information. For example, the exemplary wireless communications system is, in some embodiments, an orthogonal frequency division multiplexing (OFDM) multiple access wireless communications system using a dedicated control channel reporting structure and the transmission backlog information is uplink traffic transmission backlog information.

In some embodiments, there are different request groups and each of the different request groups corresponds to one or a set of communication queues which can be used to store data to be transmitted. In various embodiments priorities are associated with the different request groups, e.g., predetermined priorities, and a selection is performed as a function of request group priority.

Operation of the exemplary method starts in step 602, where the wireless terminal is powered on and initialized. Operation proceeds from start step 602 to step 604. In step 604, the wireless terminal determines a selected request group having the highest priority level among request groups that have non-zero backlog and can be reported by an uplink request report to be transmitted for this request opportunity.

Operation proceeds form step 604 to step 606. In step 606, the wireless terminal selects one of a plurality of reporting alternatives, at least some of said reporting alternatives corresponding to different request groups, said different reporting alternatives being part of a report format for an N bit size uplink request report, said report format defining a plurality of different N-bit mappings where N is a positive integer. In some embodiments, the plurality of different N-bit mappings includes $2^N$ or fewer mappings.

In some embodiments, selecting one of the reporting alternatives selects a reporting alternative that conveys backlog information corresponding to the selected request group. In some such embodiments, the selected reporting alternative, for at least some reporting alternatives, reports backlog information corresponding to two request groups being jointly coded in a report.

Operation proceeds from step 606 to step 608. In step 608, the wireless terminal generates an uplink request report, said generating including mapping backlog information in accordance with the selected reporting alternative to obtain an N-bit information bit pattern to be included in a generated uplink request report. For example, the uplink request report is a multi-bit, e.g., 4 bit, uplink request report in a dedicated control channel reporting structure. Then, in step 610, the wireless terminal transmits the generated uplink request report.

Operation proceeds from step 610 to step 604, where the wireless terminal determines a selected request group corresponding to another request opportunity.

Figure 7:
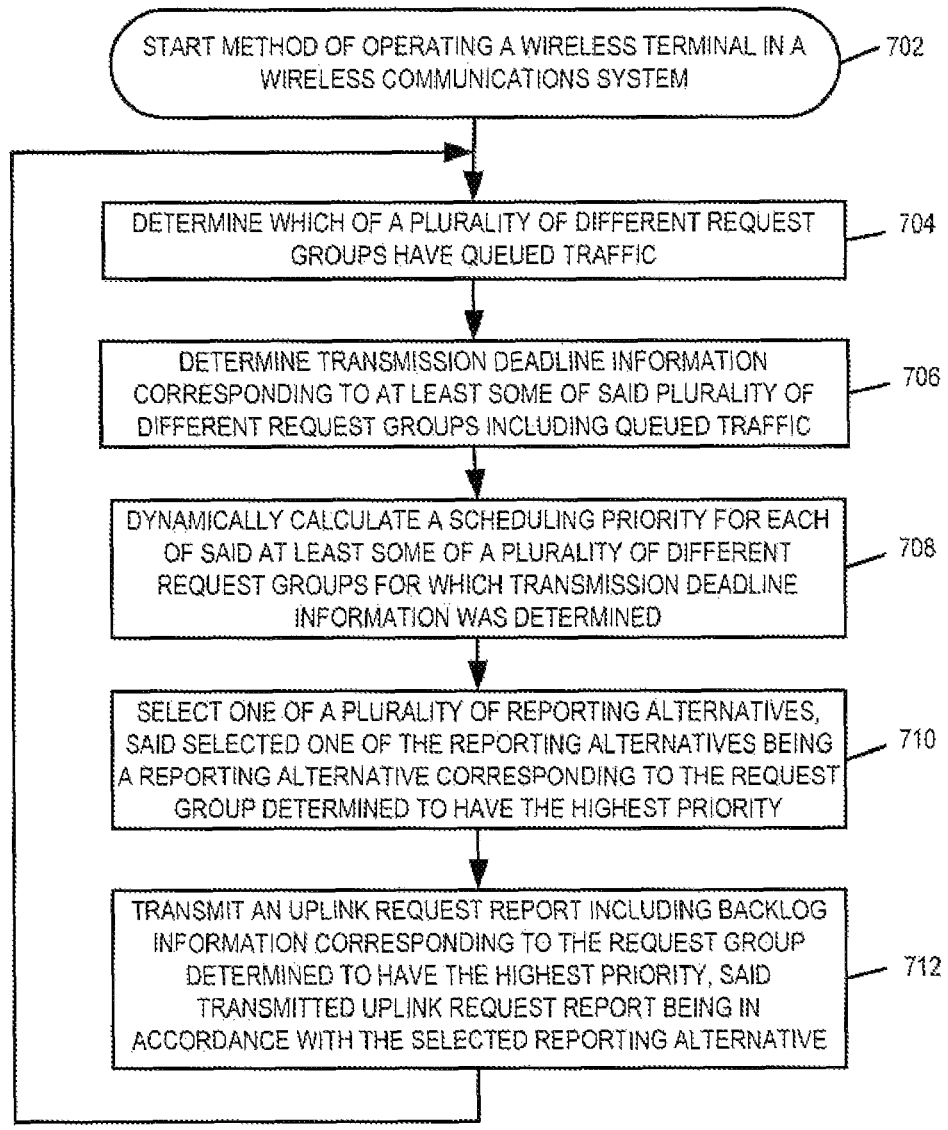
FIG. 7 is a flowchart of an exemplary method of operating a wireless terminal in a wireless communications system.

FIG. 7 is a drawing of a flowchart 700 of an exemplary method of operating a wireless terminal in a wireless communications system. For example, the exemplary wireless communications system is, in some embodiments, an orthogonal frequency division multiplexing (OFDM) multiple access wireless communications system using a dedicated control channel reporting structure including uplink request reporting opportunities for reporting transmission backlog information of uplink traffic.

Operation starts in step 702, where the wireless terminal is powered on and initialized and proceeds to step 704. In step 704, the wireless terminal determines which of a plurality of different request groups have queued traffic. In various embodiments, each of the different request groups corresponds to one or a set of communication queues which can be used to store data.

Then, in step 706, the wireless terminal determines transmission deadline information corresponding to at least some of said plurality of different request groups including queued traffic.

Operation proceeds from step 706 to step 708. In step 708, the wireless terminal dynamically calculates a scheduling priority for each of said at least some of a plurality of different request groups for which transmission deadline information was determined.

Then, in step 710, the wireless terminal selects one of a plurality of reporting alternatives said selected one of the reporting alternatives corresponding to the request groups determined to have the highest priority. In some embodiments, at least some of said reporting alternatives correspond to different request groups, said different reporting alternatives being part of a report format for an n-bit size uplink request report, said report format defining a plurality of different n-bit mappings where n is a positive integer.

In various embodiments, determining the highest priority includes considering a priority of at least one additional request group in addition to said at least some of a plurality of different request groups. In some such embodiments, said at least one additional request group is determined to have the highest priority provided it has at least some traffic to be transmitted.

In some embodiments, selecting the reporting alternative includes selecting the reporting alternative which reports backlog information corresponding to the request group having the highest calculated priority. In some embodiments, at some times, selecting the request group having the highest calculated priority includes at least some traffic that will be dropped if not allocated traffic channel resources in response to the generated uplink request report.

Operation proceeds from step 710 to step 712. In step 712, the wireless terminal transmits an uplink request report including backlog information corresponding to the request group determined to have the highest priority, said transmitted uplink request report being in accordance with the selected reporting alternative. In some embodiments, the report is a multi-bit uplink request report in a dedicated control channel reporting structure. Operation proceeds from step 712 to step 704, where the wireless terminal determines, for another point in time, which of a plurality of different request groups have queued traffic.

In some embodiments, at least some of the different request groups include a request group associated with voice traffic and a request group associated with another type of time critical traffic, and wherein a packet placed in a request group queue associated with said another type of time critical traffic is allowed to remain for a longer time than a packet placed in a request groups queue associated with voice traffic before being dropped if not transmitted. In some such embodiments, said another type of time critical traffic is gaming traffic.

In various embodiments, the relative priority level ranking between said voice traffic request group and said another type of time critical traffic changes over time, e.g., as a function of determined transmission deadline information. For example, consider that one of the voice request group and said another type of time critical traffic request group includes a packet or group of packets about to expire and be dropped if not allocated resources in an allocation corresponding to the pending request report, while the other one of the voice request group and said another type of time critical traffic request group does not includes a packet about to expire and be dropped if not allocated resources in an allocation corresponding to the pending request report. In such a situation, the higher priority can be assigned to the request group with the packet about to expire.

Figure 8:
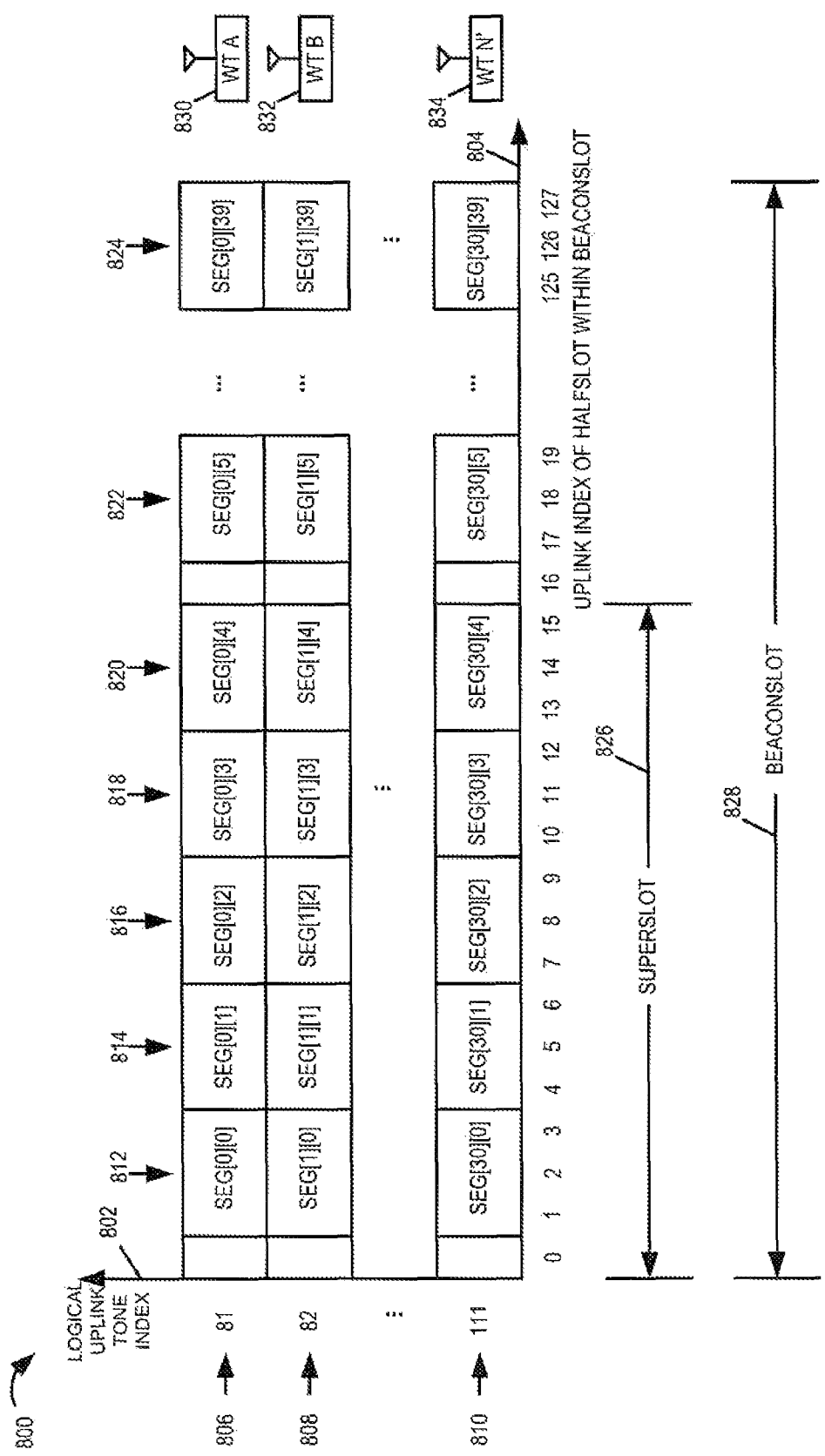
FIG. 8 is a drawing of exemplary uplink dedicated control channel (DCCH) segments in an exemplary uplink timing and frequency structure in an exemplary orthogonal frequency division multiplexing (OFDM) multiple access wireless communications system.

FIG. 8 is a drawing 800 of exemplary uplink dedicated control channel (DCCH) segments in an exemplary uplink timing and frequency structure in an exemplary orthogonal frequency division multiplexing (OFDM) multiple access wireless communications system. The uplink dedicated control channel is used to send Dedicated Control Reports (DCR) from wireless terminals to base stations. Vertical axis 802 plots logical uplink tone index while horizontal axis 804 plots the uplink index of the halfslot within a beaconslot. In this example, an uplink tone block includes 113 logical uplink tones indexed (0, . . . , 112); there are seven successive OFDM symbol transmission time periods within a halfslot, 2 additional OFDM symbol time periods followed by 16 successive half-slots within a superslot, and 8 successive superslots within a beacon slot. The first 9 OFDM symbol transmission time periods within a superslot are an access interval, and the dedicated control channel does not use the air link resources of the access interval.

The exemplary dedicated control channel is subdivided into 31 logical tones (uplink tone index 81 806, uplink tone index 82 808, . . . , uplink tone index 111 810). Each logical uplink tone (81, . . . , 111) in the logical uplink frequency structure corresponds to a logical tone indexed with respect to the DCCH channel (0, . . . , 30).

For each tone in the dedicated control channel there are 40 segments in the beaconslot corresponding to forty columns (812, 814, 816, 818, 820, 822, . . . , 824). The segment structure repeats on a beaconslot basis. For a given tone in the dedicated control channel there are 40 segments corresponding to a beaconslot 828; each of the eight superslots of the beaconslot includes 5 successive segments for the given tone. For example, for first superslot 826 of beaconslot 828, corresponding to tone 0 of the DCCH, there are five indexed segments (segment [0][0], segment [0][1], segment [0][2], segment [0][3], segment [0][4]). Similarly, for first superslot 826 of beaconslot 828, corresponding to tone 1 of the DCCH, there are five indexed segments (segment [1][0], segment [1][1], segment [1][2], segment [1][3], segment [1][4]). Similarly, for first superslot 826 of beaconslot 828, corresponding to tone 30 of the DCCH, there are five indexed segments (segment [30][0], segment [30][1], segment [30][2], segment [30][3], segment [30][4]).

In this example each segment, e.g., segment [0][0], comprises one tone for 3 successive half-slots, e.g., representing an allocated uplink air link resource of 21 OFDM tone-symbols. In some embodiments, logical uplink tones are hopped to physical tones in accordance with an uplink tone hopping sequence such that the physical tone associated with a logical tone may be different for successive half-slots, but remains constant during a given half-slot.

Each logical tone of the dedicated control channel may be assigned by the base station to a different wireless terminal using the base station as its current point of attachment. For example, logical tone (506, 508, . . . , 510) may be currently assigned to (WT A 830, WT B 832, . . . , WT N' 834), respectively.

Figure 9:
FIG. 9 includes a table of a set of exemplary Dedicated Control Channel Reports (DCRs) used in an exemplary DCCH reporting structure.

Each uplink DCCH segment is used to transmit a set of Dedicated Control Channel Reports (DCRs). A list of exemplary DCRs is given in table 900 of FIG. 9. First column 902 of table 900 describes abbreviated names used for each exemplary report. The name of each report ends with a number which specifies the number of bits of the DCR. Second column 904 of table 900 briefly describes each named report.

Figure 10:
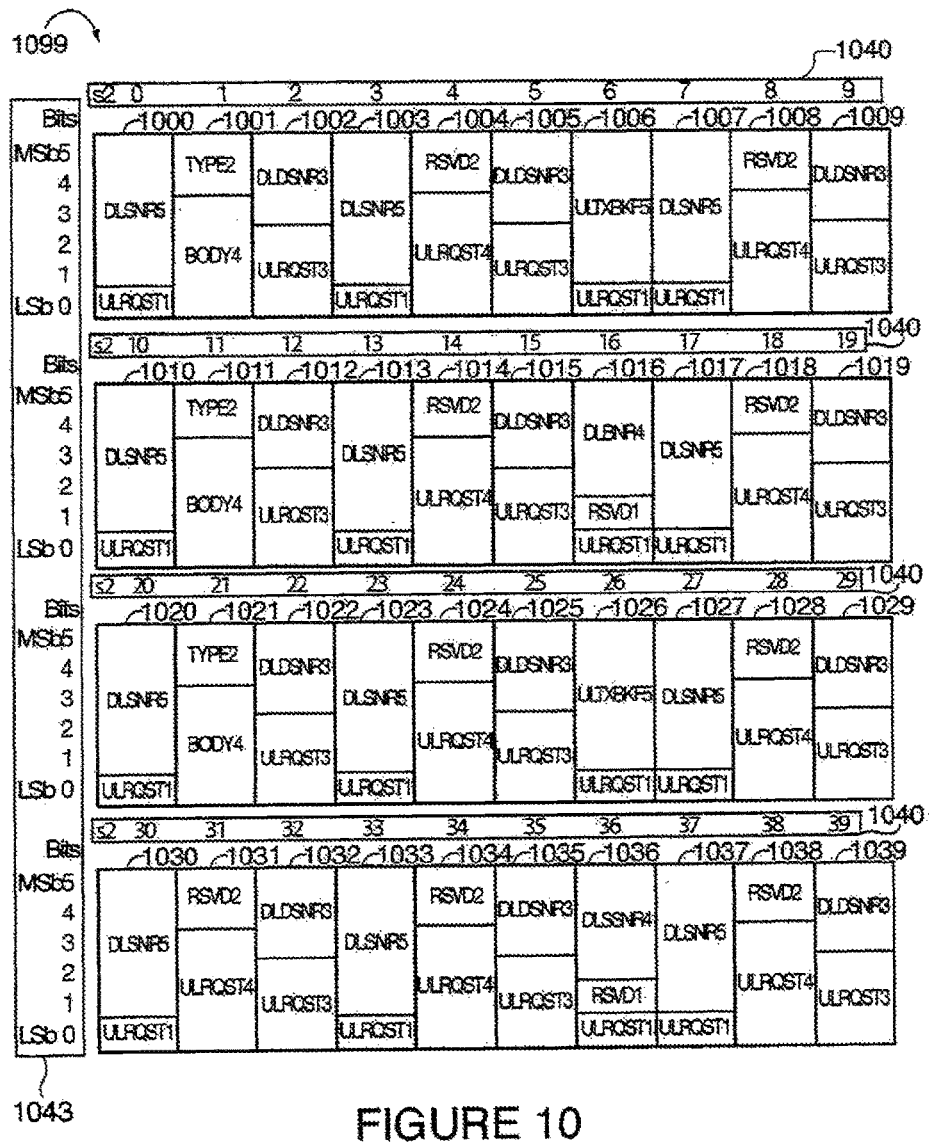
FIG. 10 is a drawing illustrating an exemplary dedicated control channel reporting format including the dedicated control channel reports of FIG. 9.

FIG. 10 is a drawing 1099 illustrating an exemplary reporting format information in an exemplary beaconslot for a given DCCH tone, e.g., corresponding to a wireless terminal. In FIG. 10, each block (1000, 1001, 1002, 1003, 1004, 1005, 1006, 1007, 1008, 1009, 1010, 1011, 1012, 1013, 1014, 1015, 1016, 1017, 1018, 1019, 1020, 1021, 1022, 1023, 1024, 1025, 1026, 1027, 1028, 1029, 1030, 1031, 1032, 1033, 1034, 1035, 1036, 1037, 1038, 1039) represents one segment whose index s2 (0, . . . , 39) is shown above the block in rectangular region 1040. Each block, e.g., block 1000 representing segment 0, conveys 6 information bits; each block comprises 6 rows corresponding to the 6 bits in the segment, where the bits are listed from the most significant bit to the least significant bit downwards from the top row to the bottom row as shown in rectangular region 1043.

Figure 11:
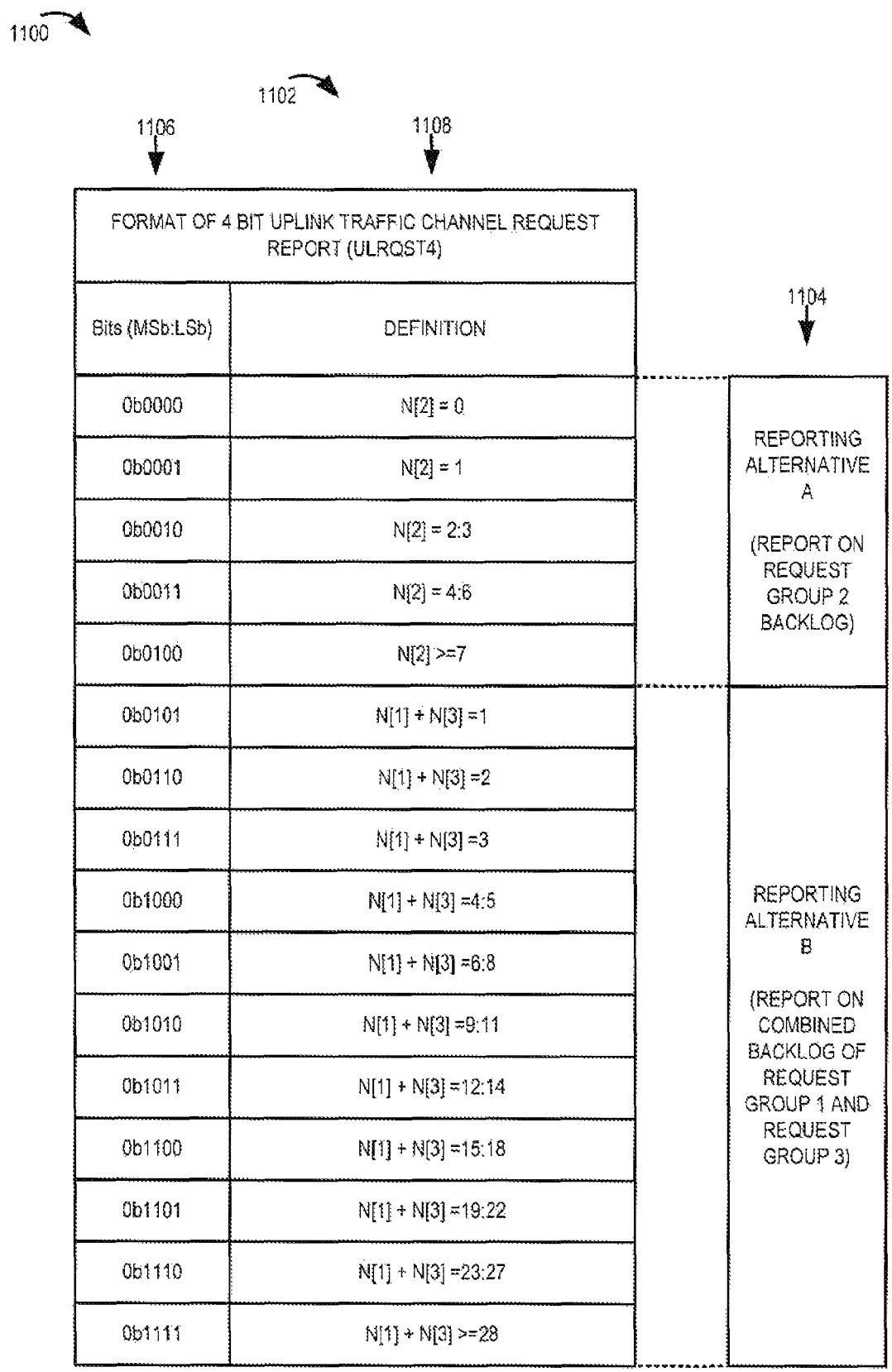
FIG. 11 is a drawing including a table describing an exemplary format of exemplary 4 bit uplink traffic request report (ULRQST4) and a column describing reporting alternatives.

FIG. 11 is a drawing 1100 including a table 1102 describing an exemplary format of exemplary 4 bit uplink traffic request report (ULRQST4) and a column 1104 describing reporting alternatives. Column 1106 of table 1102 lists the 16 possible information bit patterns for the report, and column 1108 lists reported backlog information conveyed corresponding to each of the possible bit patterns. For example, N[2]=1 indicates that request group 2 has one frame in its backlog to be transmitted; N[1]+N[3]=12:14 indicates that the combination of request group 1 and request group 3 has a total of 12, 13, or 14 frames in its backlog to be transmitted. Column 1104 indicates that reporting alternative A reports request group 2 backlog information and corresponds to bit patterns (0000, 0001, 0010, 0011, 0100). Column 1104 also indicates that reporting alternative B reports on the combined backlog of request group 1 and request group 3 and corresponds to bit patterns (0101, 0110, 0111, 1000, 1001, 1010, 1011, 1100, 1101, 1110, 1111).

Figure 12:
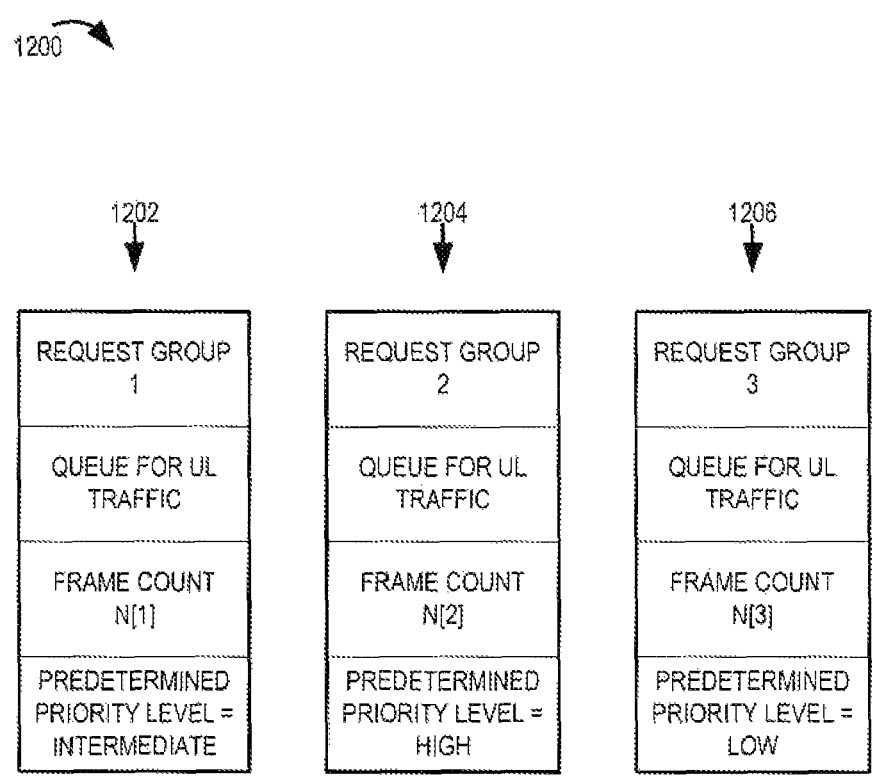
FIG. 12 is a drawing describing three exemplary request groups in an exemplary wireless terminal.

FIG. 12 is a drawing 1200 describing three exemplary request groups in an exemplary wireless terminal. Column 1202 describes that request group 1 has a queue for uplink traffic, a frame count N[2], and a predetermined priority level=intermediate. Column 1204 describes that request group 2 has a queue for uplink traffic, a frame count N[2], and a predetermined priority level=high. Column 1206 describes that request group 3 has a queue for uplink traffic, a frame count N[3], and a predetermined priority level=low.

Figure 13:
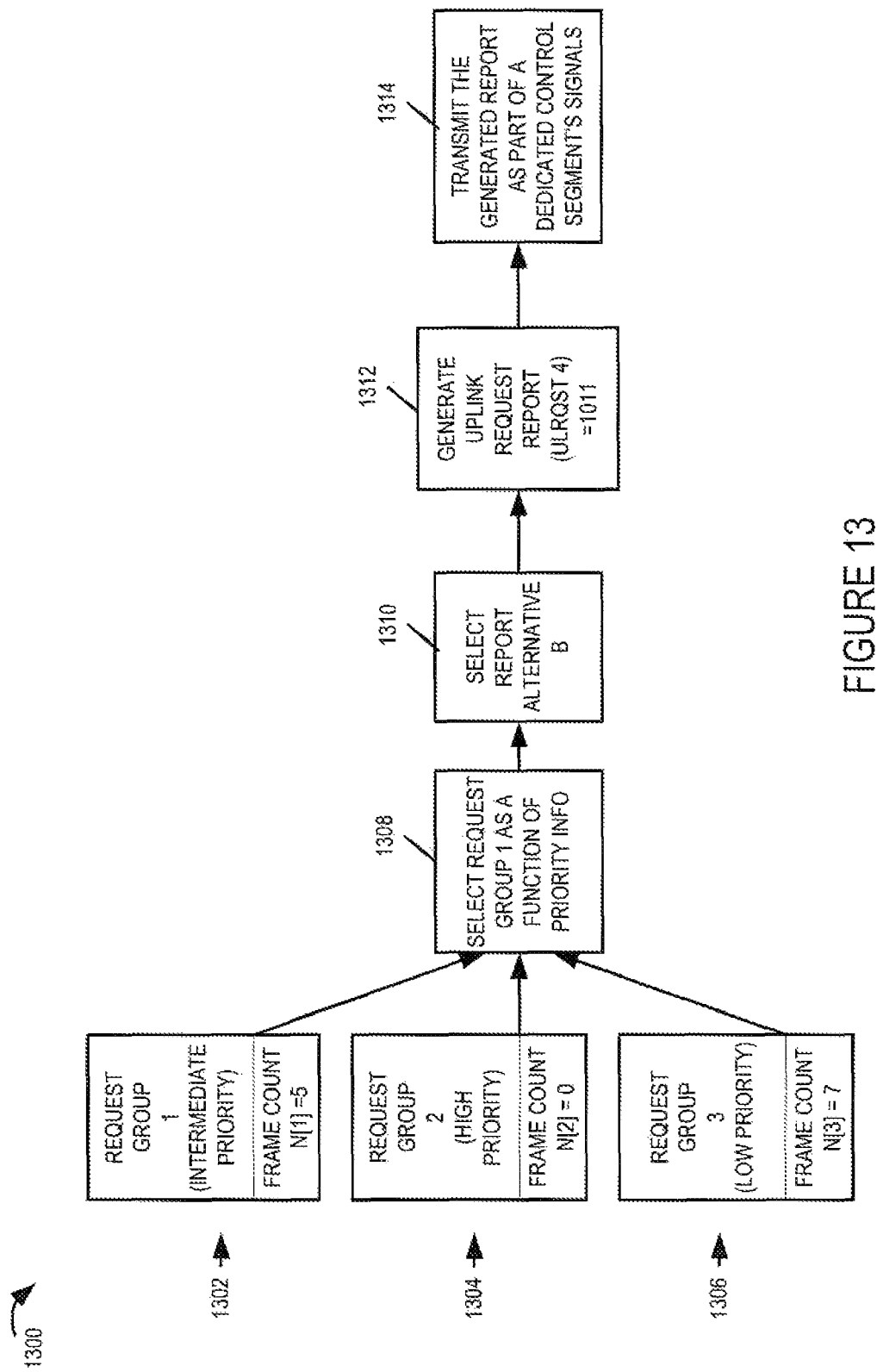
FIG. 13 is a drawing illustrating an example of a method of an exemplary wireless terminal using the exemplary 4 bit uplink request report format of FIG. 11 and including the request groups of FIG. 12.

FIG. 13 is a drawing 1300 illustrating an example of a method of an exemplary wireless terminal, e.g., wireless terminal 200, using the exemplary 4 bit uplink request report format of table 1100 of FIG. 2 and including the request groups of drawing 1200. Block 1302 shows that request group 1 with intermediate priority level has a frame count of 5; block 1304 shows that request group 2 with high priority level has a frame count of 0; block 1306 shows that request group 3 with low priority level has a frame count of 7. Block 1308 indicates that the wireless terminal selects request group 1 as a function of priority, e.g., the wireless terminal selects request group 1 because it is the request group having the highest priority level with a non-zero backlog. Block 1310 shows that the wireless terminal selects report alternative B, as report alternative B reports backlog information on request group 1. Block 1312 indicates that the wireless terminal generates an uplink request report with information bit pattern=1011; namely, N[1]+N[3]=12, which is the range 12:14 which maps to bit pattern 1011. Then, block 1314 indicates the wireless terminal transmits the generated uplink request report as part of a dedicated control segment's signals.

Figure 14:
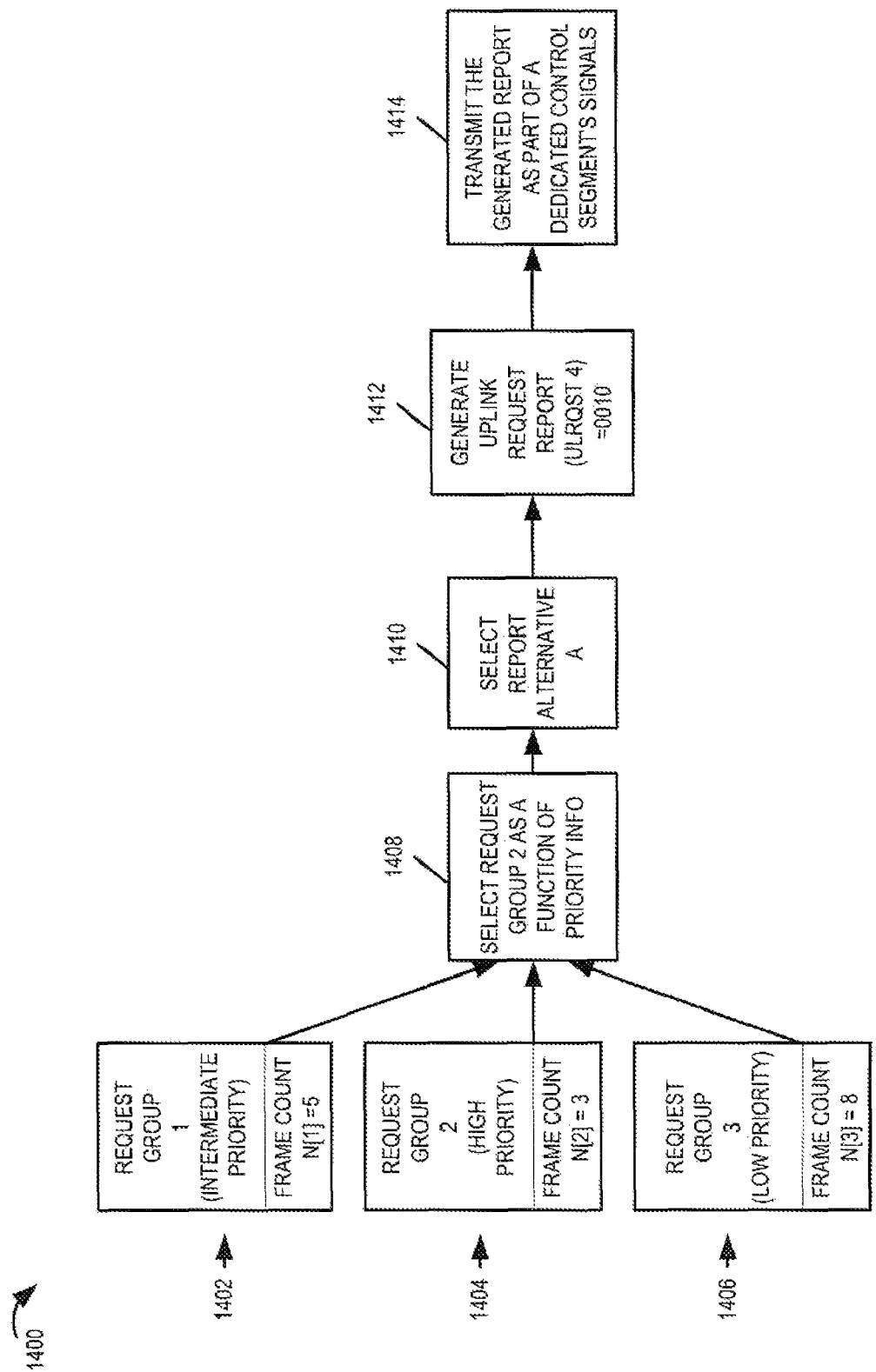
FIG. 14 is a drawing illustrating another example of a method of an exemplary wireless terminal, using the exemplary 4 bit uplink request report format of FIG. 11 and including the request groups of FIG. 12.

FIG. 14 is a drawing 1400 illustrating an example of a method of an exemplary wireless terminal, e.g., wireless terminal 200, using the exemplary 4 bit uplink request report format of table 1100 of FIG. 2 and including the request groups of drawing 1200. Block 1402 shows that request group 1 with intermediate priority level has a frame count of 5; block 1404 shows that request group 2 with high priority level has a frame count of 3; block 1406 shows that request group 3 with low priority level has a frame count of 8. Block 1408 indicates that the wireless terminal selects request group 2 as a function of priority, e.g., the wireless terminal selects request group 2 because it is the request group having the highest priority level with a non-zero backlog. Block 1410 shows that the wireless terminal selects report alternative A, as report alternative A reports backlog information on request group 2. Block 1412 indicates that the wireless terminal generates an uplink request report with information bit pattern=0010; namely, N[2]=3, which is the range 2:3 which maps to bit pattern 0010. Then, block 1414 indicates the wireless terminal transmits the generated uplink request report as part of a dedicated control segment's signals.

Figure 15:
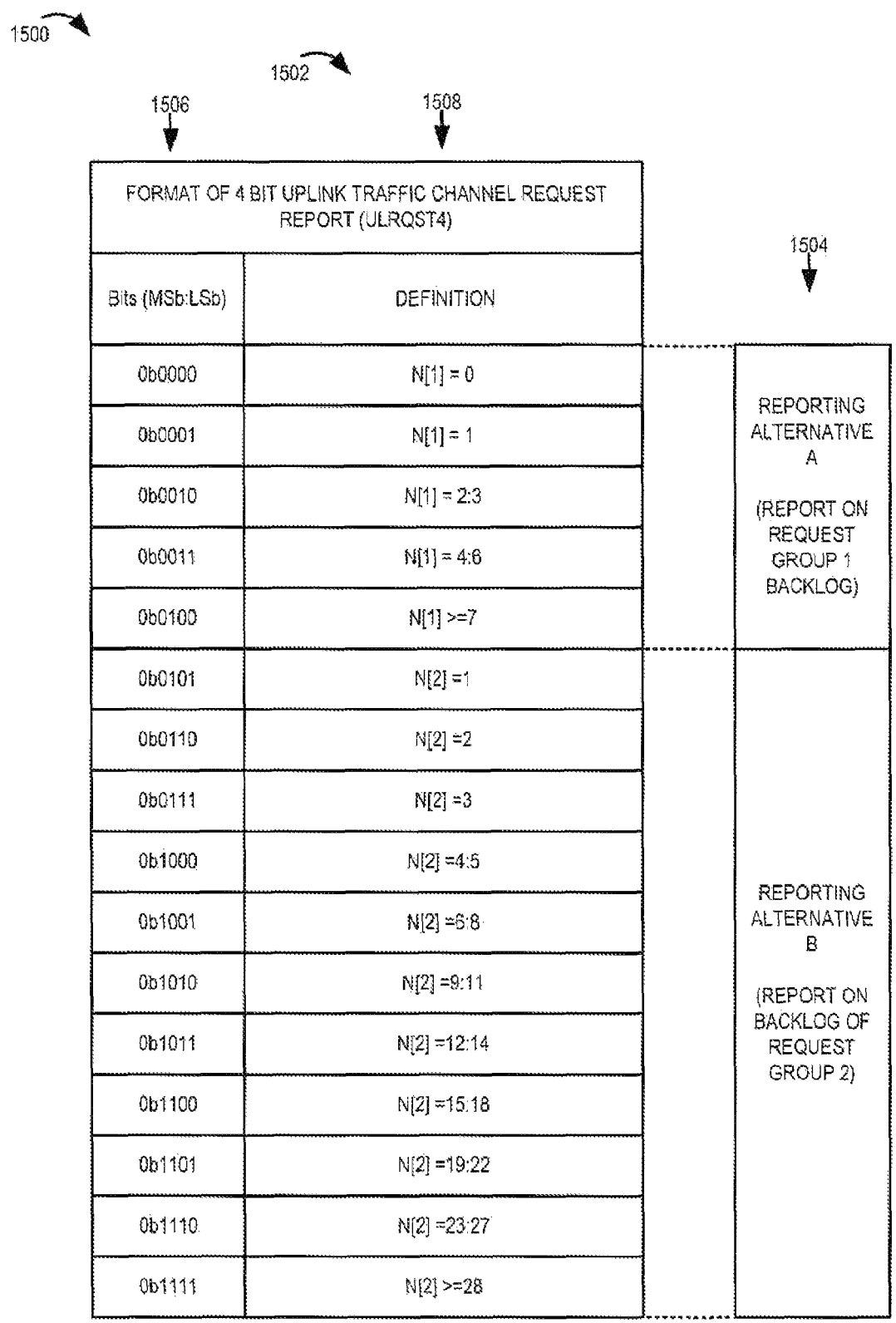
FIG. 15 is a drawing including a table describing an exemplary format of exemplary 4 bit uplink traffic request report (ULRQST4) and a column describing reporting alternatives.

FIG. 15 is a drawing 1500 including a table 1502 describing an exemplary format of exemplary 4 bit uplink traffic request report (ULRQST4) and a column 1504 describing reporting alternatives. Column 1506 of table 1502 lists the 16 possible information bit patterns for the report, and column 1508 lists reported backlog information conveyed corresponding to each of the possible bit patterns. For example, N[1]=1 indicates that request group 1 has one frame in its backlog to be transmitted; N[2]=4:5 indicates that request group 2 has a total of 4 or 5 frames in its backlog to be transmitted. Column 1504 indicates that reporting alternative A reports request group 1 backlog information and corresponds to bit patterns (0000, 0001, 0010, 0011, 0100). Column 1504 also indicates that reporting alternative B reports on request group 2 backlog and corresponds to bit patterns (0101, 0110, 0111, 1000, 1001, 1010, 1011, 1100, 1101, 1110, 1111).

Figure 16:
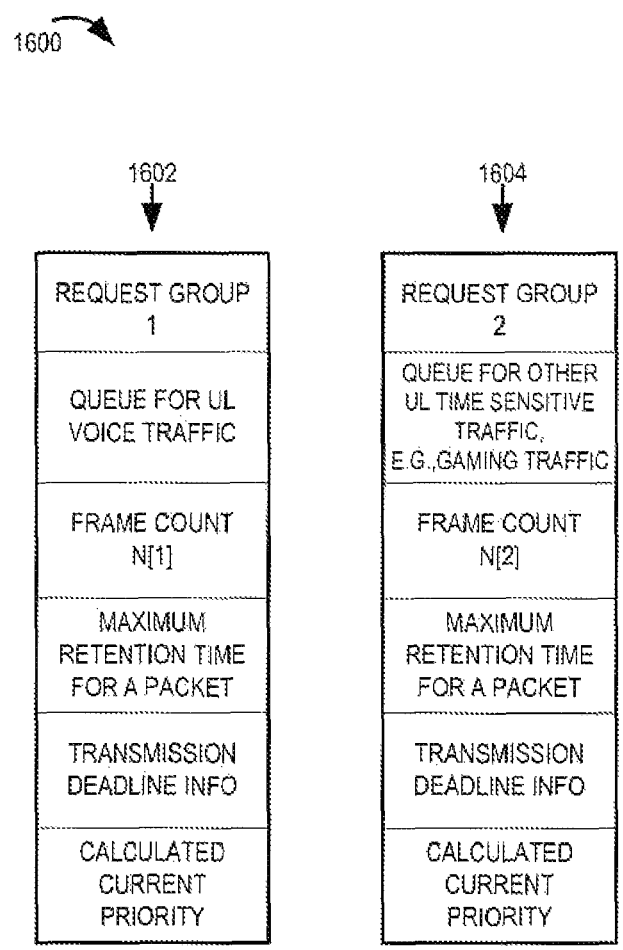
FIG. 16 is a drawing describing two exemplary request groups in an exemplary wireless terminal.

FIG. 16 is a drawing 1600 describing two exemplary request groups in an exemplary wireless terminal. Column 1602 describes that request group 1 has a queue for uplink voice traffic, a frame count N[1], a maximum retention time for a packet before discarding, transmission deadline information, and a calculated current priority. Column 1604 describes that request group 2 has a queue for uplink other time sensitive traffic, e.g., gaming traffic, a frame count N[2], a maximum retention time for a packet before discarding, transmission deadline information, and a calculated current priority.

Figure 17:
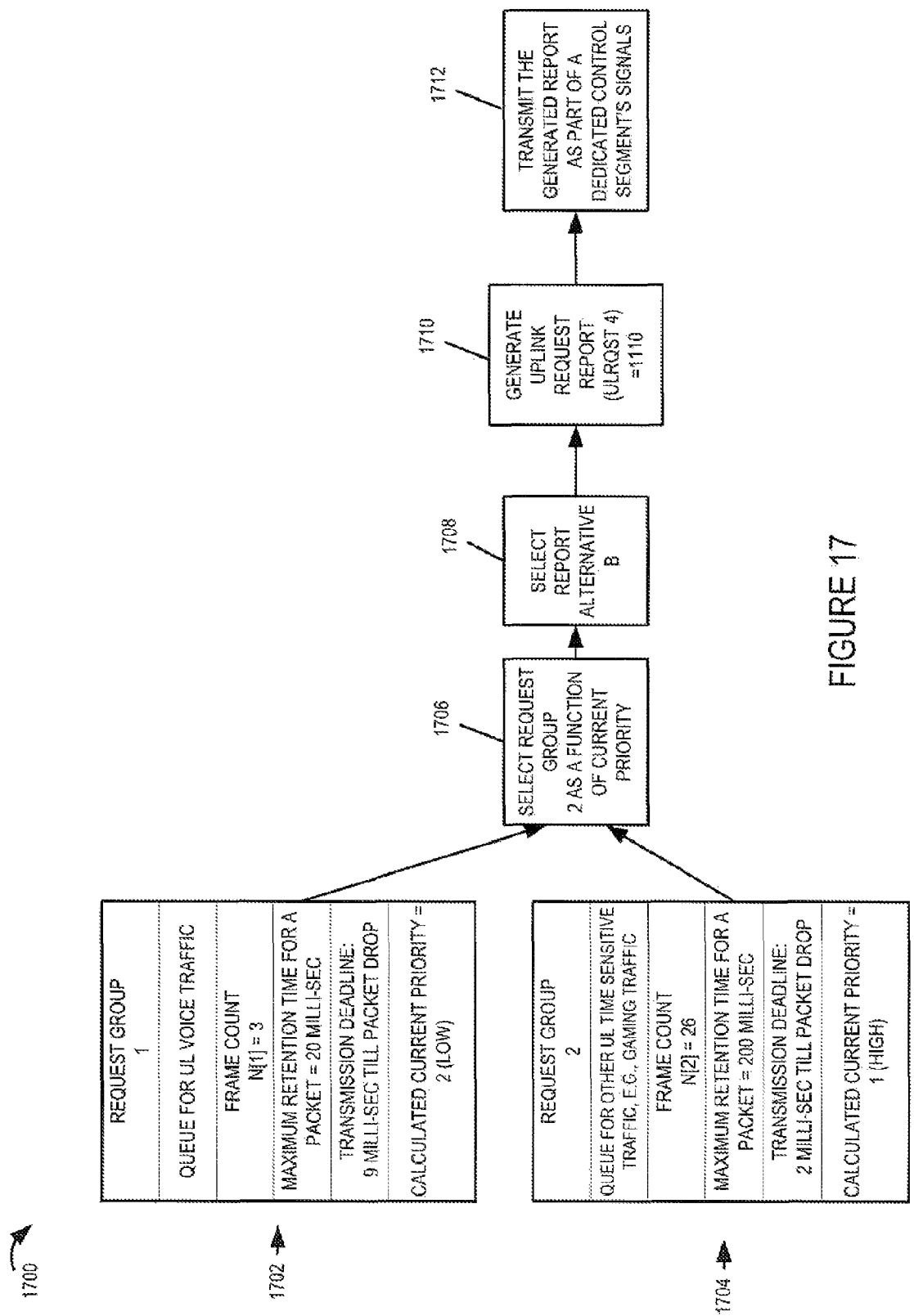
FIG. 17 is a drawing illustrating an example of a method of an exemplary wireless terminal using the exemplary 4 bit uplink request report format of FIG. 15 and including the request groups of FIG. 16.

FIG. 17 is a drawing 1700 illustrating an example of a method of an exemplary wireless terminal, e.g., wireless terminal 400, using the exemplary 4 bit uplink request report format of table 1500 of FIG. 15 and including the request groups of drawing 1600. Block 1702 shows that request group 1, used for voice traffic, has a frame count of 3, a maximum packet retention time of 20 milli-seconds, and a current transmission deadline of 9 milli-sec before a packet will be dropped if not transmitted; block 1704 shows that request group 2, used for other time sensitive traffic such as gaming traffic, has a frame count of 26, a maximum packet retention time of 200 milli-seconds, and a current transmission deadline of 2 milli-sec before a packet will be dropped if not transmitted. The transmission deadlines have been calculated by the wireless terminal, and the wireless terminal calculates current priority levels as a function of that information. In this example, the wireless terminal has calculated the current priority level=2 (low priority) for request group 1 as indicated by information 1702 and has calculated the current priority level=1 (high) for request group 2 as indicated by information 1704, e.g., selecting the request group with the smaller transmission deadline value to have the higher priority. Block 1706 indicates that the wireless terminal selects request group 2 as a function of current priority, e.g., the wireless terminal selects the request group having the highest calculated priority. Block 1708 shows that the wireless terminal selects report alternative B, as report alternative B reports backlog information on request group 2. Block 1710 indicates that the wireless terminal generates an uplink request report with information bit pattern=1110; namely, N[2]=26, which is the range 23:27 which maps to bit pattern 1110. Then, block 1712 indicates the wireless terminal transmits the generated uplink request report as part of a dedicated control segment's signals.

Figure 18:
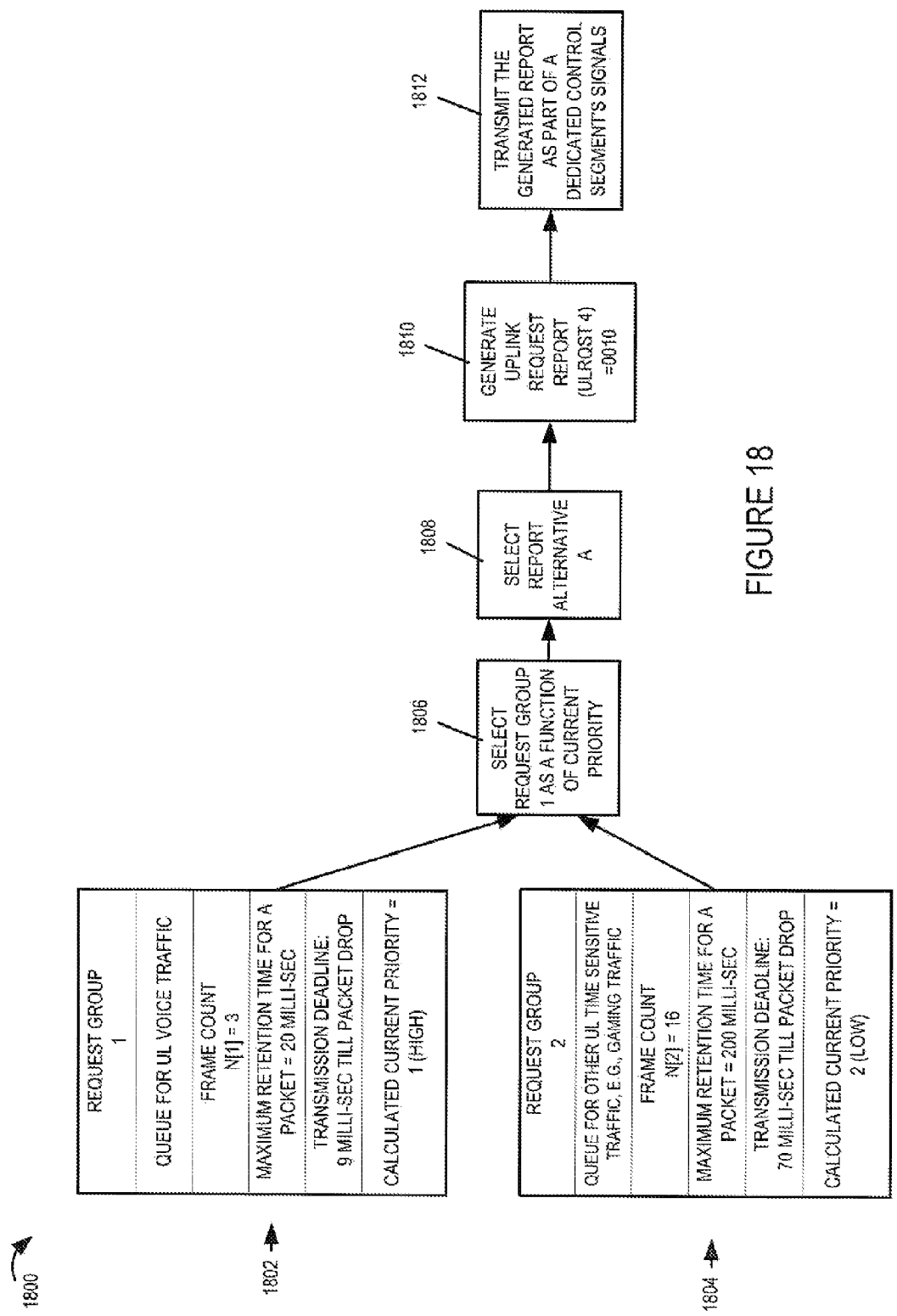
FIG. 18 is a drawing illustrating another example of a method of an exemplary wireless terminal using the exemplary 4 bit uplink request report format of FIG. 15 and including the request groups of FIG. 16.

FIG. 18 is a drawing 1800 illustrating another example of a method of an exemplary wireless terminal, e.g., wireless terminal 400, using the exemplary 4 bit uplink request report format of table 1500 of FIG. 15 and including the request groups of drawing 1600. Block 1802 shows that request group 1, used for voice traffic, has a frame count of 3, a maximum packet retention time of 20 milli-seconds, and a current transmission deadline of 9 milli-sec before a packet will be dropped if not transmitted; block 1804 shows that request group 2, used for other time sensitive traffic such as gaming traffic, has a frame count of 16, a maximum packet retention time of 200 milli-seconds, and a current transmission deadline of 70 milli-sec before a packet will be dropped if not transmitted. The transmission deadlines have been calculated by the wireless terminal, and the wireless terminal calculates current priority levels as a function of that information. In this example, the wireless terminal has calculated the current priority level=1 (high priority) for request group 1 as indicated by information 1802 and has calculated the current priority level=2 (low) for request group 2 as indicated by information 1804, e.g., selecting the request group with the smaller transmission deadline value to have the higher priority. Block 1806 indicates that the wireless terminal selects request group 1 as a function of current priority, e.g., the wireless terminal selects the request group having the highest calculated priority. Block 1808 shows that the wireless terminal selects report alternative A, as report alternative A reports backlog information on request group 1. Block 1810 indicates that the wireless terminal generates an uplink request report with information bit pattern=0010; namely, N[1]=3, which is the range 3:3 which maps to bit pattern 0010. Then, block 1812 indicates the wireless terminal transmits the generated uplink request report as part of a dedicated control segment's signals.

Figure 19:
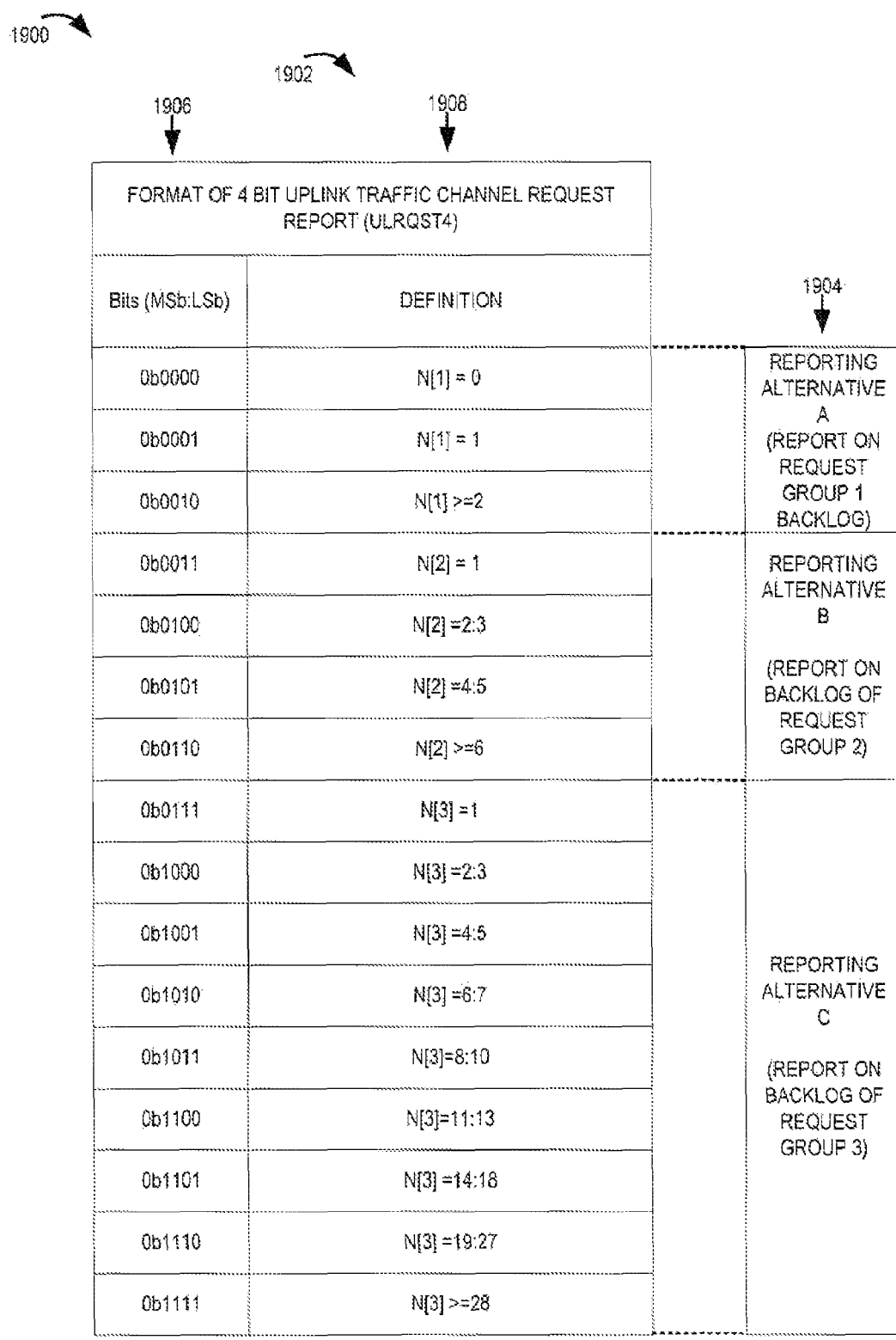
FIG. 19 is a drawing including a table describing an exemplary format of exemplary 4 bit uplink traffic request report (ULRQST4) and a column describing reporting alternatives.

FIG. 19 is a drawing 1900 including a table 1902 describing an exemplary format of exemplary 4 bit uplink traffic request report (ULRQST4) and a column 1904 describing reporting alternatives. Column 1906 of table 1902 lists the 16 possible information bit patterns for the report, and column 1908 lists reported backlog information conveyed corresponding to each of the possible bit patterns. For example, N[1]=1 indicates that request group 1 has one frame in its backlog to be transmitted; N[2]=4:5 indicates that request group 2 has a total of 4 or 5 frames in its backlog to be transmitted. N[3]>=28 indicates that request group 3 has 28 or more frames in its backlog to be communicated. Column 1904 indicates that reporting alternative A reports request group 1 backlog information and corresponds to bit patterns (0000, 0001, 0010). Column 1904 also indicates that reporting alternative B reports on request group 2 backlog and corresponds to bit patterns (0011, 0100, 0101, 0110) and that reporting alternative C reports on request group 3 backlog and corresponds to bit patterns (0111, 1000, 1001, 1010, 1011, 1100, 1101, 1110, 1111).

Figure 20:
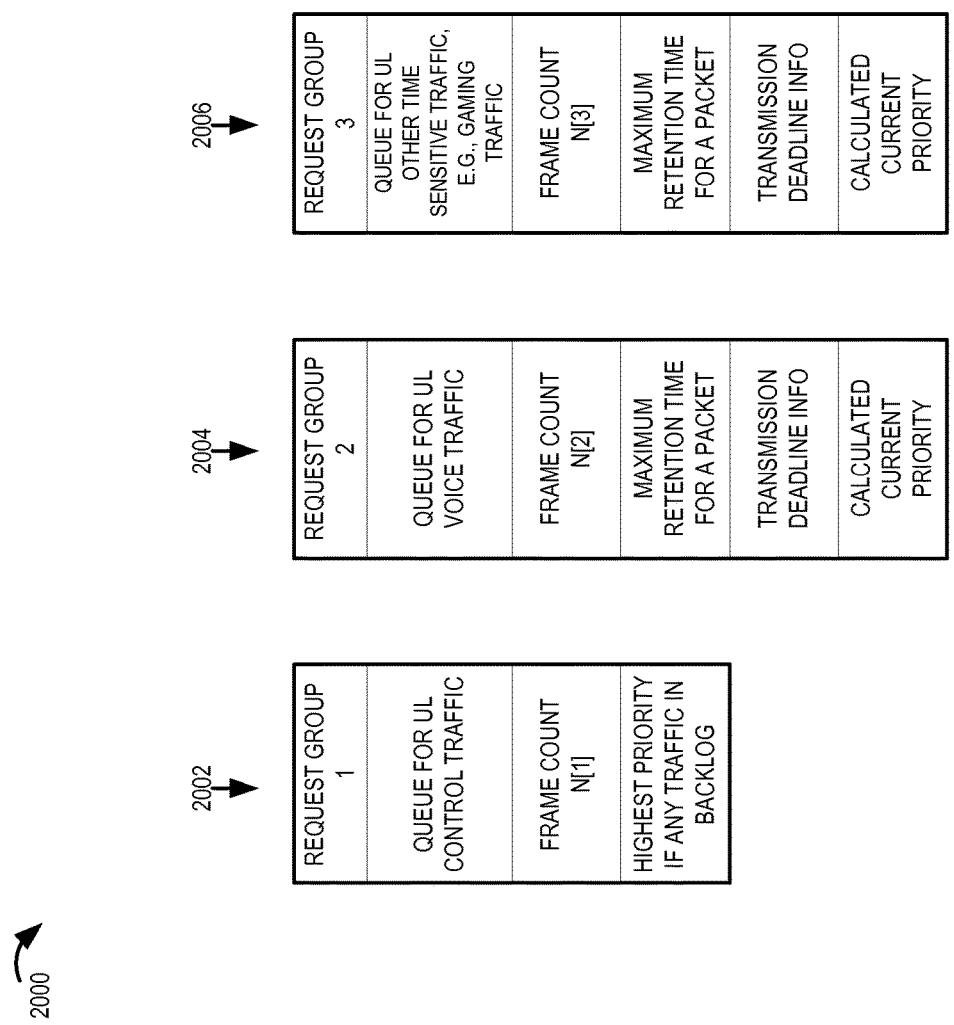
FIG. 20 is a drawing describing three exemplary request groups in an exemplary wireless terminal.

FIG. 20 is a drawing 2000 describing three exemplary request groups in an exemplary wireless terminal. Column 2002 describes that request group 1 has a queue for uplink control traffic, a frame count N[1], and that the request group assumes the highest priority if it has any traffic in its backlog. Column 2004 describes that request group 2 has a queue for uplink voice traffic, a frame count N[2], a maximum retention time for a packet before discarding, transmission deadline information, and a calculated current priority. Column 2006 describes that request group 3 has a queue for uplink other time sensitive traffic, e.g., gaming traffic, a frame count N[3], a maximum retention time for a packet before discarding, transmission deadline information, and a calculated current priority.

Figure 21:
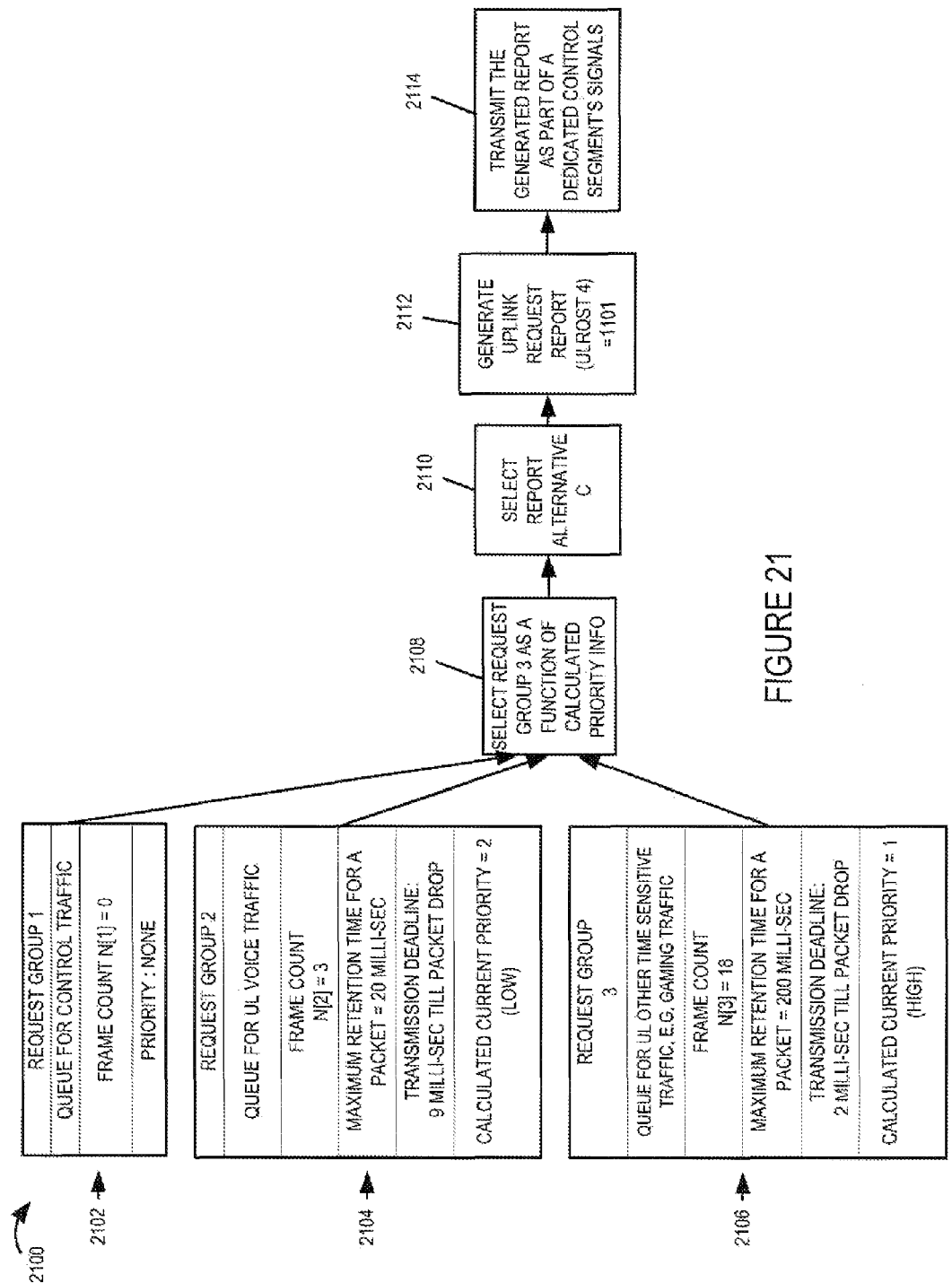
FIG. 21 is a drawing illustrating an example of a method of an exemplary wireless terminal using the exemplary 4 bit uplink request report format of FIG. 19 and including the request groups of FIG. 20.

FIG. 21 is a drawing 2100 illustrating an example of a method of an exemplary wireless terminal, e.g., wireless terminal 400, using the exemplary 4 bit uplink request report format of table 1900 of FIG. 19 and including the request groups of drawing 2000 of FIG. 20. Block 2102 shows that request group 1 used for control traffic has a zero frame count backlog and therefore is removed from consideration regarding priority. Block 2104 shows that request group 2, used for voice traffic, has a frame count of 3, a maximum packet retention time of 20 milli-seconds, and a current transmission deadline of 9 milli-sec before a packet will be dropped if not transmitted; block 2106 shows that request group 3, used for other time sensitive traffic such as gaming traffic, has a frame count of 18, a maximum packet retention time of 200 milli-seconds, and a current transmission deadline of 2 milli-sec before a packet will be dropped if not transmitted. The transmission deadlines have been calculated by the wireless terminal, and the wireless terminal calculates current priority levels as a function of that information. In this example, the wireless terminal has calculated the current priority level=2 (low priority) for request group 2 as indicated by information 2104 and has calculated the current priority level=1 (high) for request group 3 as indicated by information 2106, e.g., selecting the request group with the smaller transmission deadline value to have the higher priority. Block 2108 indicates that the wireless terminal selects request group 2 as a function of current calculated priority, e.g., the wireless terminal selects the request group having the highest calculated priority. Block 2110 shows that the wireless terminal selects report alternative C, as report alternative C reports backlog information on request group 3. Block 2112 indicates that the wireless terminal generates an uplink request report with information bit pattern=1101; namely, N[3]=18, which is the range 14:18 which maps to bit pattern 1101. Then, block 2114 indicates the wireless terminal transmits the generated uplink request report as part of a dedicated control segment's signals.

Figure 22:
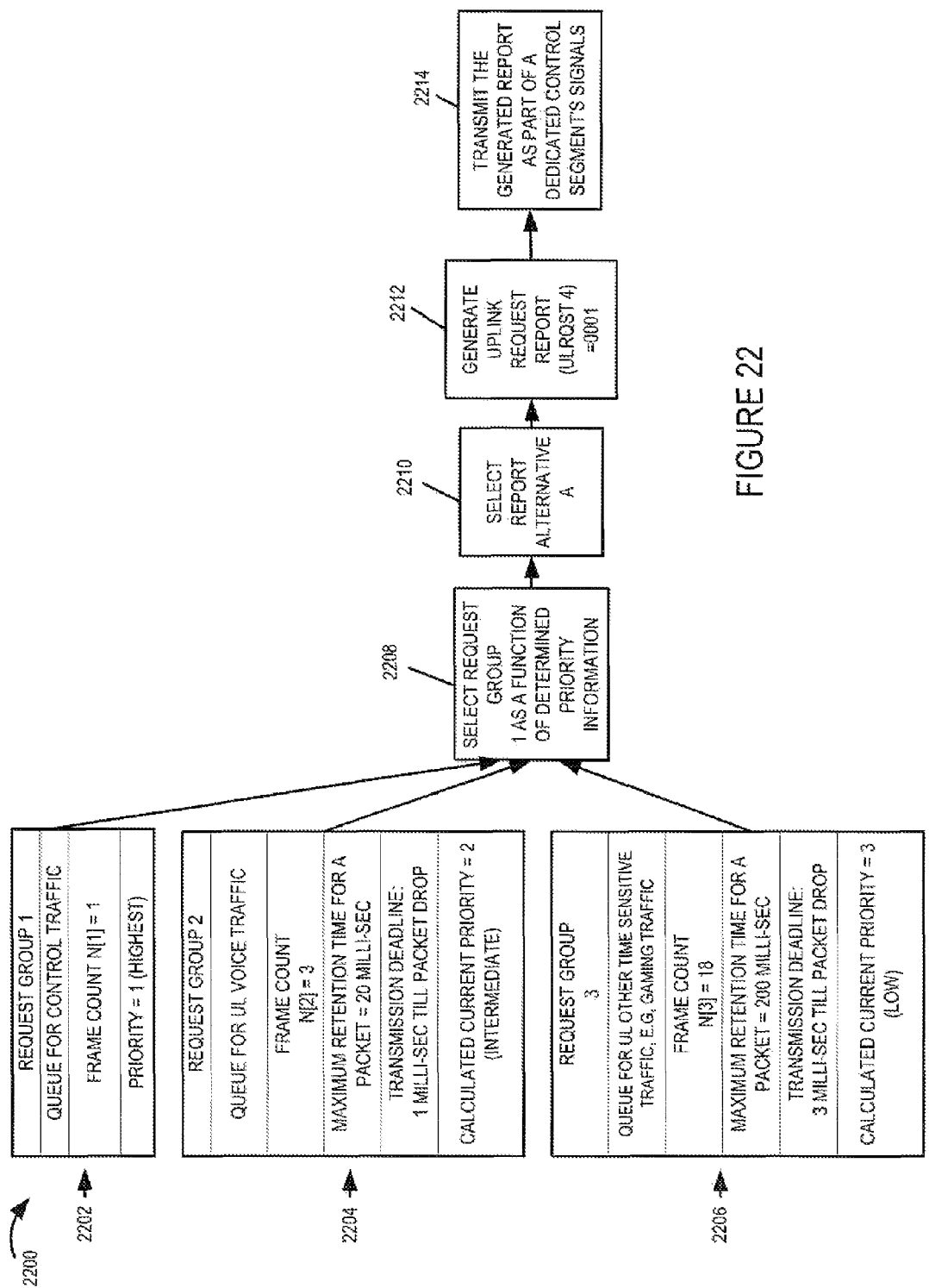
FIG. 22 is a drawing illustrating another example of a method of an exemplary wireless terminal using the exemplary 4 bit uplink request report format of FIG. 19 and including the request groups of FIG. 20.

FIG. 22 is a drawing 2200 illustrating another example of a method of an exemplary wireless terminal, e.g., wireless terminal 400, using the exemplary 4 bit uplink request report format of table 1900 of FIG. 19 and including the request groups of drawing 2000 of FIG. 20. Block 2202 shows that request group 1 used for control traffic has a frame count=1 and therefore assumes the highest priority level=1. Block 2204 shows that request group 2, used for voice traffic, has a frame count of 3, a maximum packet retention time of 20 milli-seconds, and a current transmission deadline of 1 milli-sec before a packet will be dropped if not transmitted; block 2206 shows that request group 3, used for other time sensitive traffic such as gaming traffic, has a frame count of 18, a maximum packet retention time of 200 milli-seconds, and a current transmission deadline of 3 milli-sec before a packet will be dropped if not transmitted. The transmission deadlines have been calculated by the wireless terminal, and the wireless terminal calculates current priority levels as a function of that information. In this example, the wireless terminal has a non-zero backlog in request group 1 which assumes the highest priority and overrides any calculated priority determinations of the other request groups. Block 2208 indicates that the wireless terminal selects request group 1 as a function of the determined priority information. Block 2210 shows that the wireless terminal selects report alternative A, as report alternative A reports backlog information on request group 1. Block 2212 indicates that the wireless terminal generates an uplink request report with information bit pattern=0001; namely, N[1]=1, which maps to bit pattern 0001. Then, block 2214 indicates the wireless terminal transmits the generated uplink request report as part of a dedicated control segment's signals.

In some embodiments, in which transmission deadline information is calculated corresponding to request groups, a report format is such that for at least reporting alternatives multiple request groups are jointly coded. In some embodiments, at least some of the information to bit mapping definitions include control factors based upon information such as a previously transmitted power report and/or a previously transmitted interference report. In some embodiments, at least some of the information to bit mapping definitions indicate no change from a previously transmitted report.

While described in the context of an OFDM system, the methods and apparatus of various embodiments, are applicable to a wide range of communications systems including many non-OFDM and/or non-cellular systems.

In various embodiments nodes described herein are implemented using one or more modules to perform the steps corresponding to one or more methods, for example, signal processing, report alternative selection, report generation, deadline determination, scheduling priority calculation. In some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s).

Numerous additional variations on the methods and apparatus described above will be apparent to those skilled in the art in view of the above descriptions. Such variations are to be considered within scope. The methods and apparatus of various embodiments may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of various embodiments.

What is claimed is:

1. A method of operating a wireless terminal in a wireless communications system to communicate transmission backlog information, comprising:
    selecting a set of groups, from a plurality of sets of groups, to prepare a fixed size uplink report, wherein:
        a first number of possible uplink report values corresponds to a first one of said plurality of sets of groups, and
        a second number of possible uplink report values corresponds to a second one of said plurality of sets of groups;
    generating said fixed size uplink report, said generating including:
        mapping backlog information to one of the uplink report values corresponding to the selected set of groups, the selected set of groups being associated with a plurality of queues, and
        obtaining a bit pattern to be included in said fixed size uplink report, wherein a single value of the bit pattern in the generated fixed size uplink report indicates a backlog of traffic for the plurality of queues associated with the selected set of groups; and
    transmitting the generated fixed size uplink report.

2. The method of claim 1, wherein each set of groups, in said plurality of sets of groups, corresponds to one or a set of communication queues which are used to store data to be transmitted.

3. The method of claim 1, wherein priorities are associated with the sets of groups and wherein said selection is performed as a function of said priorities.

4. The method of claim 3 wherein said priorities are predetermined.

5. The method of claim 3, wherein selecting a set of groups includes selecting the set of groups having the highest priority level among the sets of groups that have a non-zero backlog.

6. The method of dam 5, wherein the first number is 5 and the second number is 11.

7. The method of claim 6, wherein said fixed size uplink report is a multi-bit uplink report that is transmitted periodically according to a dedicated control channel reporting structure.

8. The method of claim 1, wherein at least some of said plurality of sets of groups correspond to different numbers of queues, a first one of said plurality of sets of groups corresponding to a single queue, a second one of said sets of groups corresponding to multiple queues.

9. The method of claim 1, wherein at least one of said first and second numbers is a number which is not an integer multiple of two.

10. The method of claim 9 wherein said first number is five.

11. The method of claim 1, wherein at least one of the values corresponding to the first set of groups indicates a zero backlog and wherein the values corresponding to the second set of groups only include values corresponding to non-zero backlogs.

12. The method of claim 1, wherein said first group set includes a single queue and said second group set includes two queues.

13. A wireless terminal for use in a wireless communications system to communicate transmission backlog information, comprising:
   a selection module for selecting a set of groups, from a plurality of sets of groups, to prepare a fixed size uplink report, wherein:
      a first number of possible uplink report values corresponds to a first one of said plurality of sets of groups, and
      a second number of possible uplink report values corresponds to a second one of said plurality of sets of groups;
   a report generation module for generating said fixed size uplink report, said generating including:
   mapping backlog information to one of the uplink report values corresponding to the selected set of groups, the selected set of groups being associated with a plurality of queues, and
   obtaining a bit pattern to be included in said fixed size uplink report, wherein a single value of the bit pattern in the generated fixed size uplink report indicates a backlog of traffic for the plurality of queues associated with the selected set of groups; and
   a transmitter for transmitting the generated fixed size uplink report to thereby communicate transmission backlog information.

14. The wireless terminal of claim 13, further comprising a plurality of communications queues for storing data to be transmitted, each set of groups, in said plurality of sets of groups, corresponding to one or a set of said communication queues.

15. The wireless terminal of claim 13, further comprising:
   memory including stored priority information, wherein said stored priority information associates priorities with the sets of groups and wherein said selection is performed as a function of said stored priority information.

16. The wireless terminal of claim 13 wherein said priorities are predetermined.

17. The wireless terminal of claim 13, wherein said selection module selects a set of groups having the highest priority level among the sets of groups that have a non-zero backlog.

18. The wireless terminal of claim 17, wherein the first number is 5 and the second number is 11.

19. The wireless terminal of claim 18, wherein said fixed size uplink report is a multi-bit uplink report which occurs periodically in a dedicated control channel reporting structure.

20. The wireless terminal of claim 13, wherein at least some of said plurality of sets of groups correspond to different numbers of queues, a first one of said plurality of sets groups corresponding to a single queue, a second one of said sets of groups corresponding to multiple queues.

21. The wireless terminal of claim 13, wherein at least one of said first and second numbers is a number which is not an integer multiple of two.

22. The wireless terminal of claim 21 wherein said first number is five.

23. A wireless terminal for use in a wireless communications system to communicate transmission backlog information, comprising:
   means for selecting a set of groups, from a plurality of sets of groups, to prepare a fixed size uplink report, wherein:
      a first number of possible uplink report values corresponds to a first one of said plurality of sets of groups, and
      a second number of possible uplink report values corresponds to a second one of said plurality of sets of groups;
   means for generating said fixed size uplink report, said generating including:
      mapping backlog information to one of the uplink report values corresponding to the selected set of groups, the selected set of groups being associated with a plurality of queues, and
      obtaining an information bit pattern to be included in said fixed size uplink report, wherein a single value of the bit pattern in the generated fixed size uplink report indicates a backlog of traffic for the plurality of queues associated with the selected set of groups; and
   means for transmitting the generated fixed size uplink report to thereby communicate transmission backlog information.

24. The wireless terminal of claim 23, further comprising:
   means for storing a plurality of communications queues for storing data to be transmitted, each set of groups, in said plurality of sets of groups, corresponding to one or a set of said communication queues.

25. The wireless terminal of claim 23, further comprising:
   means for storing priority information, wherein said priority information associates priorities with the sets of groups and wherein said selection is performed as a function of said priority information.

26. The wireless terminal of claim 25 wherein said priorities are predetermined.

27. The wireless terminal of claim 25, wherein said means for selecting include means for selecting a set of groups having the highest priority level among the groups that have a non-zero backlog.

28. The wireless terminal of claim 27, wherein the first number is 5 and the second number is 11.

29. The wireless terminal of claim 18, wherein at least one of said first and second numbers is a number which is not an integer multiple of two.

30. The wireless terminal of claim 29 wherein said first number is five.

31. The wireless terminal of claim 23, wherein at least one of the values corresponding to the first set of groups indicates a zero backlog and wherein the values corresponding to the second set of groups only include values corresponding to non-zero backlogs.

32. A non-transitory computer readable medium embodying machine executable instructions for operating a wireless terminal to perform a method in a wireless communications system in which the wireless terminal communicates transmission backlog information, the method comprising:
   selecting a set of groups, from a plurality of sets of groups to prepare a fixed size uplink report, wherein:
      a first number of possible uplink report values corresponds to a first one of said plurality of sets of groups, and
      a second number of possible uplink report values corresponds to a second one of said plurality of sets of groups;
   generating said fixed size uplink report, said generating including:

mapping backlog information to one of the uplink report values corresponding to the selected set of groups, the selected set of groups being associated with a plurality of queues, and obtaining a bit pattern to be included in said fixed size uplink report, wherein a single value of the bit pattern in the generated fixed size uplink report indicates a backlog of traffic for the plurality of queues associated with the selected set of groups; and transmitting the generated fixed size uplink report.

33. The computer readable medium of claim 32, wherein each set of groups, in said plurality of sets of groups, corresponds to one or a set of communication queues which are used to store data to be transmitted.

34. The computer readable medium of claim 32, wherein priorities are associated with the sets of groups and wherein said selection is performed as a function of said priorities.

35. The computer readable medium of claim 32 wherein said priorities are predetermined.

36. The computer readable medium of claim 34, wherein said selecting a set of groups includes selecting the set of groups having the highest priority level among the sets of groups that have a non-zero backlog.

37. The computer readable medium of claim 36, wherein the first number is 5 and the second number is 11.

38. The computer readable medium of claim 32, wherein at least one of said first and second numbers is a number which is not an integer multiple of two.

39. The computer readable medium of claim 38 wherein said first number is five.

40. A device for use in a wireless communications system, the device comprising:

a processor configured to:
    select a set of groups, from a plurality of sets of groups, to prepare a fixed size uplink report, wherein:
        a first number of possible uplink report values corresponds to a first one of said plurality of sets of groups, and
        a second number of possible uplink report values corresponds to a second one of said plurality of sets of groups;
    generate said it fixed size uplink request report, said generating including:
        mapping backlog information to one of the uplink request report values corresponding to the selected set of groups, the selected set of groups being associated with a plurality of queues, and
        obtaining a bit pattern to be included in said fixed size uplink report, wherein a single value of the bit pattern in the generated fixed size uplink report indicates a backlog of traffic for the plurality of queues associated with the selected set of groups; and
    control transmission of the generated fixed size uplink report.

41. The device of claim 40, wherein each set of groups, in said plurality of sets of groups, corresponds to one or a set of communication queues which are used to store data to be transmitted.

42. The device of claim 40, wherein priorities are associated with groups and wherein said selection is performed as a function of said priorities.

43. The device of claim 42 wherein said priorities are predetermined.

44. The device of claim 42, wherein said processor is further configured to:
    select the set of groups having the highest priority level among the sets of groups that have a non-zero backlog.

45. The device of claim 44, wherein the first number is 5 and the second number is 11.

46. The device of claim 40, wherein at least one of said first and second numbers is a number which is not an integer multiple of two.

47. The device of claim 38 wherein said first number is five.

* * * * *